US012738080B2

(12) United States Patent
Cai et al.

(10) Patent No.: US 12,738,080 B2
(45) Date of Patent: Sep. 15, 2026

(54) MICROSCOPIC IMAGE PROCESSING METHOD AND APPARATUS, COMPUTER DEVICE, AND STORAGE MEDIUM

(71) Applicant: Tencent Technology (Shenzhen) Company Limited, Shenzhen (CN)

(72) Inventors: De Cai, Shenzhen (CN); Xiao Han, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 248 days.

(21) Appl. No.: 18/603,081

(22) Filed: Mar. 12, 2024

(65) Prior Publication Data

US 2024/0221400 A1 Jul. 4, 2024

Related U.S. Application Data

(63) Continuation of application No. PCT/CN2023/094954, filed on May 18, 2023.

(30) Foreign Application Priority Data

Jul. 19, 2022 (CN) ......................... 202210849205.1

(51) Int. Cl.
*G06V 20/69* (2022.01)
*G06T 7/11* (2017.01)
(Continued)

(52) U.S. Cl.
CPC ............. *G06V 20/695* (2022.01); *G06T 7/11* (2017.01); *G06T 7/12* (2017.01); *G06T 7/246* (2017.01);
(Continued)

(58) Field of Classification Search
CPC .. G06F 16/7837; G06V 10/25; G06V 20/693; G06V 10/10; G06V 20/698; G06V 10/42;
(Continued)

(56) References Cited

U.S. PATENT DOCUMENTS 9,129,379 B2 * 9/2015 Sorgi ..................... G06T 7/194

FOREIGN PATENT DOCUMENTS

CN 112017189 A 12/2020
CN 113780145 A 12/2021
(Continued)

OTHER PUBLICATIONS

Greg J. Stephens et al., "Dimensionality and Dynamics in the Behavior of C. elegans", PLoS Computational Biology, vol. 4, Iss. 4, Apr. 2008, 10 pgs.

(Continued)

*Primary Examiner* — Courtney Joan Nelson
(74) *Attorney, Agent, or Firm* — Morgan, Lewis & Bockius LLP

(57) ABSTRACT

This application discloses a microscopic image processing method performed by a computer device. The method includes: extracting an instance image of a target object from a microscopic image; obtaining skeleton form information of the target object from the instance image, the skeleton form information representing a skeleton form of the target object; performing motion analysis on the target object based on the skeleton form information to obtain a plurality of eigenvalues; and determining an eigenvalue sequence comprising the plurality of eigenvalues as motion component information of the target object.

18 Claims, 19 Drawing Sheets

(51) Int. Cl.
*G06T 7/12* (2017.01)
*G06T 7/246* (2017.01)
*G06V 10/42* (2022.01)
*G06V 10/44* (2022.01)
*G06V 10/77* (2022.01)

(52) U.S. Cl.
CPC .............. *G06V 10/42* (2022.01); *G06V 10/44* (2022.01); *G06V 10/77* (2022.01); *G06V 20/698* (2022.01); *G06T 2207/10056* (2013.01); *G06T 2207/20081* (2013.01)

(58) Field of Classification Search
CPC .......... G06V 10/77; G06V 10/44; G06T 7/11; G06T 7/246; G06T 7/70; G06T 7/12; G06T 2207/10056; G06T 2207/20081
See application file for complete search history.

(56) References Cited

FOREIGN PATENT DOCUMENTS

| | | | |
|---|---|---|---|
| CN | 115205262 | A | 10/2022 |
| EP | 3866113 | A1 | 8/2021 |

OTHER PUBLICATIONS

Laetitia Hebert et al., "WormPose: Image Synthesis and Convolutional Networks for Pose Estimation in C. elegans", PLoS Computational Biology, Apr. 2021, 20 pgs.
Lei Ke at al., "Deep Occlusion-Aware Instance Segmentation with Overlapping BiLayers", Proceedings of the IEEE/CVF Conference on Computer Vision and Pattern Recognition, Jun. 2021, 10 pgs.
Wei Geng at al., "Automated Worm Tracking and Classification", The 37th Asilomar Conference on Signals, Systems & Computers, May 2004, 7 pgs.
Tencent Technology, ISR, PCT/CN2023/094954, Sep. 6, 2023, 3 pgs.
Tencent Technology, WO+IPRP, PCT/CN2023/0949514, Dec. 18, 2024, 7 pgs.
Tencent Technology, Extended European Search Report, EP Patent Application No. 23841881.8, May 2, 2025, 9 pgs.
Pablo E. Layana Castro et al., "Improving Skeleton Algorithm for Helping *Caenorhabditis elegans* Trackers", Scientific Reports, vol. 10, No. 1, Article No. 22247, Dec. 2020, 12 pgs.

* cited by examiner

900

MICROSCOPIC IMAGE PROCESSING METHOD AND APPARATUS, COMPUTER DEVICE, AND STORAGE MEDIUM

CROSS-REFERENCE TO RELATED APPLICATIONS

This application is a continuation application of PCT Patent Application No. PCT/CN2023/094954, entitled "MICROSCOPIC IMAGE PROCESSING METHOD AND APPARATUS, COMPUTER DEVICE, AND STORAGE MEDIUM" filed on May 18, 2023, which claims priority to Chinese Patent Application No. 202210849205.1, entitled "MICROSCOPIC IMAGE PROCESSING METHOD AND APPARATUS, COMPUTER DEVICE, AND STORAGE MEDIUM" filed on Jul. 19, 2022, all of which is incorporated herein by reference in its entirety.

FIELD OF THE TECHNOLOGY

This application relates to the field of image processing technologies, and in particular, to a microscopic image processing method and apparatus, a computer device, and a storage medium.

BACKGROUND OF THE DISCLOSURE

Nematodes are a classic multicellular organism with a short life cycle. Because the nematodes are small, easy to cultivate, and made up of a small quantity of cells, and can be operated in large batches like microorganisms, there is a need to study morphology and pedigrees of the nematodes.

SUMMARY

Embodiments of this application provide a microscopic image processing method and apparatus, a computer device, and a storage medium, to reduce labor costs of microscopic image analysis and improve efficiency of the microscopic image analysis. Technical solutions are as follows:

According to an aspect, a microscopic image processing method is performed by a computer device. The method includes:

- extracting an instance image of a target object from a microscopic image;
- obtaining skeleton form information of the target object from the instance image, the skeleton form information representing a skeleton form of the target object;
- performing motion analysis on the target object based on the skeleton form information to obtain a plurality of eigenvalues; and
- determining an eigenvalue sequence including the plurality of eigenvalues as motion component information of the target object.

According to an aspect, a computer device is provided. The computer device includes one or more processors and one or more memories, the one or more memories store at least one computer program, and the at least one computer program is loaded and executed by the one or more processors and causing the computer device to implement the foregoing microscopic image processing method.

According to an aspect, a non-transitory computer-readable storage medium is provided. The computer-readable storage medium stores at least one computer program, and the at least one computer program is loaded and executed by a processor of a computer device and causes the computer device to implement the foregoing microscopic image processing method.

DESCRIPTION OF EMBODIMENTS

Figure 1:
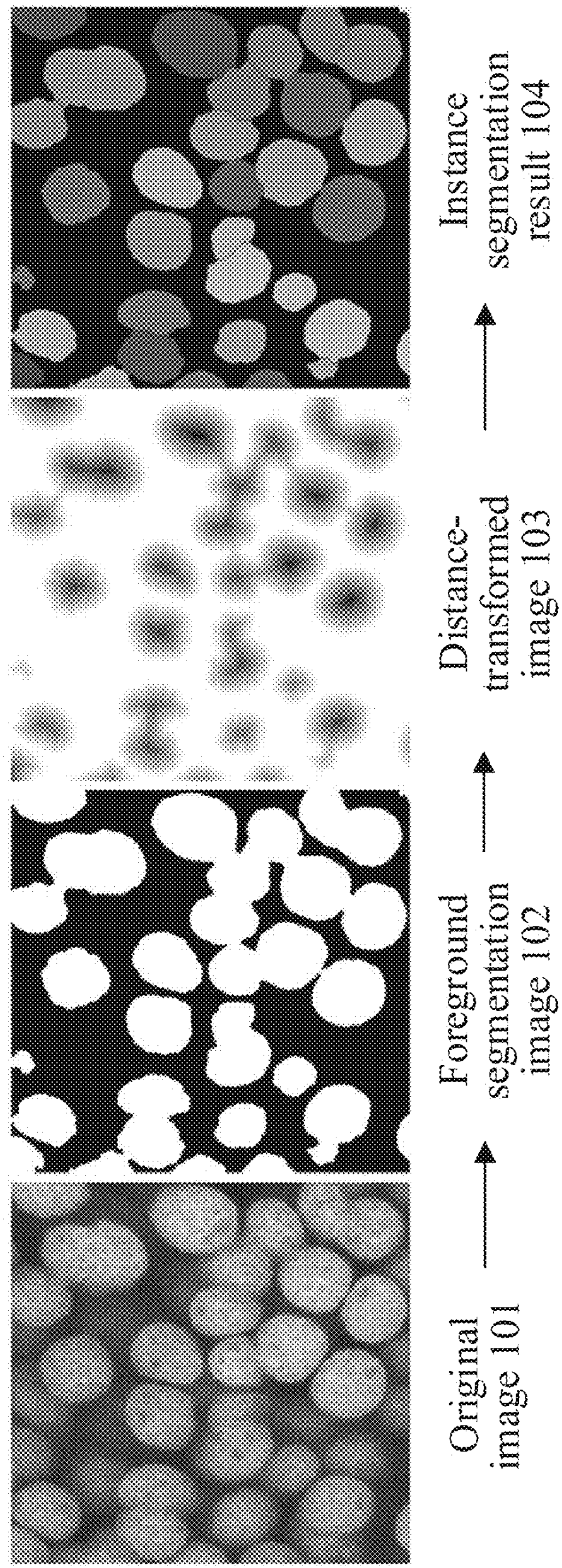
FIG. 1 is a principle flowchart of a method for segmenting a round target according to an embodiment of this application.

Terms in embodiments of this application are described as follows:

Nematode: As an example of a target object in this application, the nematode is a classic model organism. As a multicellular organism with a short life cycle, the nematode is small, easy to cultivate, and made up of a small quantity of cells, and can be operated in large batches like microorganisms. Therefore, morphology and pedigrees of the constitutive cells can be studied exhaustively. A cuticle mainly including collagen, lipid, and glycoprotein can be formed above an epithelial layer of the nematode. The cuticle is a protective exoskeleton of the nematode, and is a necessary structure for the nematode to maintain a form.

Otsu's algorithm: is an automatic thresholding method self-adaptive to bimodality and proposed by Japanese scholar Nobuyuki Otsu in 1979, and is also referred to as the Otsu's method, the maximum between-class variance method, the maximum variance automatic thresholding method, and the like. Through the Otsu's algorithm, an image is divided into two parts, namely, background and a target, according to a gray-scale characteristic of the image. A greater between-class variance between the background and the target indicates a greater difference between the two parts of the image. The difference between the two parts is reduced when a part of the target is wrongly divided into the background or a part of the background is wrongly divided into the target. Therefore, segmentation that maximizes the between-class variance indicates a minimum probability of wrong division.

Watershed algorithm: also referred to as a watershed segmentation method, is a mathematical-morphology segmentation method based on atopological theory. A basic idea of the algorithm is to view an image as a topographic surface in geodesy, and a gray value of each pixel in the image represents an altitude of the point, where each local minimum and a region influenced by the local minimum are referred to as a catchment basin, and a boundary of the catchment basin forms a watershed. The concept and formation of the watershed can be described by simulating an immersion process. A small hole is pierced through a surface of each local minimum, and then a whole model is slowly immersed into water. As the model is immersed with a deeper depth, an influence region of each local minimum slowly expands outward, to form a dam at a junction of two catchment basins, in other words, form the watershed.

Distance transform: For a binary image, a value of a foreground pixel is converted into a distance from the point to a nearest background point, or a value of a background pixel is converted into a distance from the point to a nearest foreground point.

Skeleton extraction algorithm: is a skeleton extraction algorithm in the image field, and is actually to extract a central pixel contour of a target in an image. In other words, the target is refined with reference to a target center, and a refined target generally has a single-layer pixel width. Current skeleton extraction algorithms may be classified into an iterative algorithm and a non-iterative algorithm. Using the iterative algorithm as an example, a binary image (such as a mask) is usually operated, to continuously erode and refine a target from a target periphery to a target center by using a feature of a 3×3 pixel window centered on a pixel to be detected, until the target can no longer be eroded (having a single-layer pixel width). In this way, a skeleton of the image is obtained.

Region of interest (ROI): In the fields of machine vision and image processing, a region that needs to be processed and that is outlined from a processed image in a form of box, circle, ellipse, irregular polygon, or the like is referred to as the ROI. In a microscopic image processing scenario, the ROI is a region that is in a microscopic image and that includes a target object to be observed, for example, a rectangular region that includes the target object and that is outlined by a rectangular frame. Alternatively, the ROI may be outlined by a circular frame, an elliptical frame, or other irregular polygonal frames. The ROI is a focus of this image analysis (to be specific, only a foreground region including the target object is concerned, and a remaining background region is not concerned).

Histogram of oriented gradients (HOG) feature: The HOG feature is a feature descriptor for object detection in computer vision and image processing, and is formed by calculating and collecting statistics on a histogram of gradient directions of a local region of an image. A main idea of the HOG feature is: In an image, an appearance and a shape of a local target can be well described by gradients or oriented intensity distribution at edges, and an essence thereof is statistical information of the gradients, and the gradients mainly exist at edges. The embodiments of this application relate to performing head-tail recognition (or head-tail classification or head-tail detection) by using a HOG feature of a skeleton endpoint, in other words, determining whether a current endpoint is a head endpoint or a tail endpoint of a nematode.

Support vector machine (SVM): The SVM is a kind of generalized linear classifier for performing binary classification on data through supervised learning, and a decision boundary of the SVM is a maximum margin hyperplane for solving a learning sample. The SVM uses a hinge loss function to calculate an empirical risk, and adds a regularization term to a solution system to optimize a structural risk. The SVM is a sparse and stable classifier. The embodiments of this application relate to performing binary-classification recognition on a HOG feature of a skeleton endpoint using the SVM, to determine whether a current endpoint is a head endpoint or a tail endpoint of a nematode.

Scale: A scale space of a signal means filtering an original signal by using a series of one-parameters and a Gaussian filter with an increasing width, to obtain a group of low-frequency signals; while a scale space of an image feature means using an image feature extracted for an image as the foregoing original signal. Pyramidization of an image feature enables efficient multi-scale expression of the image feature. Usually, upsampling is performed from a bottom-layer feature (for example, an original-scale feature), and a series of features obtained through sampling are fused with the bottom-layer feature, to obtain a feature with high resolution and strong semantics (in other words, feature extraction is enhanced).

In the related art, nematodes in a petri dish are usually observed under a microscope, and imaging analysis is performed on the nematodes through a CCD image sensor on the microscope, to output a microscopic image of the nematodes. The microscopic image is mainly manually analyzed in a conventional research manner. For example, counting, segmentation, morphological measurement, and kinematic analysis are manually performed on the nematodes in the microscopic image. This manual analysis manner for the microscopic image is obviously high in labor costs and low in analysis efficiency.

A conventional nematode segmentation method is shown in FIG. 1. FIG. 1 is a principle flowchart of a method for segmenting a round target according to an embodiment of this application. A target foreground is usually extracted by using the Otsu's algorithm after an original image 101 is acquired by a CCD image sensor of a microscope, to obtain a foreground segmentation image 102. Next, distance transform is performed on the foreground segmentation image 102 to obtain a center point of each target, and a distance-transformed image 103 is formed. Then, on the basis of the distance-transformed image 103, a watershed algorithm is executed by using these central points as seeds to implement a multi-target segmentation task, to obtain an instance segmentation result 104. Herein, an example in which each target in the original image 101 is a round target is used for description.

The foregoing conventional nematode segmentation method has a high image quality requirement, and requires no interfering impurities in the image; and also has a high requirement on a signal-to-noise ratio of the CCD image acquired by the microscope. Segmentation accuracy is greatly reduced in a case with a low signal-to-noise ratio or many impurities. Moreover, many optional parameters in both the Otsu's algorithm and the distance transform need to be manually debugged by a technician. This consumes high labor costs and results in low analysis efficiency. In addition, the nematode segmentation method cannot deal with complex nematode targets such as overlapping nematodes (to be specific, there is an overlapping part between two nematode targets) or a twisting nematode (different body parts of a single nematode target overlap due to twisting). As a mollusk, the nematode is easy to form a self-overlapping or twisting shape during observation. However, the conventional nematode segmentation method cannot process an overlapping region.

Figure 2:
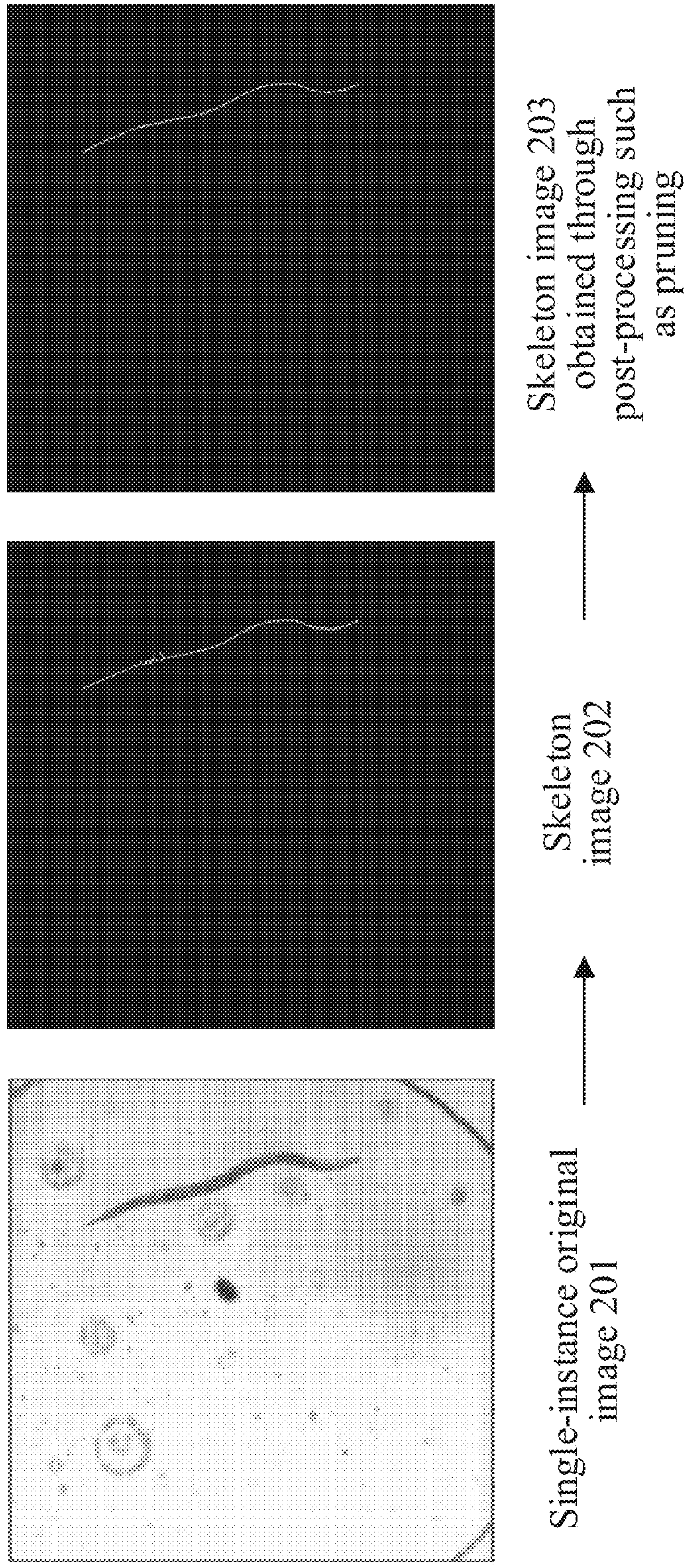
FIG. 2 is a principle flowchart of a conventional skeleton extraction method according to an embodiment of this application.

A conventional skeleton extraction algorithm is shown in FIG. 2. FIG. 2 is a principle flowchart of a conventional skeleton extraction method according to an embodiment of this application. On the basis of an instance segmentation result, an original image acquired by a microscope may be truncated to obtain a single-instance original image 201 including only a single nematode target. Next, the skeleton extraction algorithm is performed on the single-instance original image 201 to obtain a skeleton image 202 of the single nematode target. Then, post-processing such as pruning is performed on the skeleton image 202 to prune off some small branches, to obtain a skeleton image 203 representing a skeleton between the head and the tail of the nematode.

The foregoing conventional skeleton extraction algorithm strongly relies on application of prior knowledge of the target. For example, the nematode is a long mollusk object, and this prior knowledge needs to be correspondingly fused into skeleton extraction. In addition, the conventional skeleton extraction algorithm is easy to produce many noisy skeletons such as burrs, and the post-processing needs to be performed. This is low in processing efficiency and consumes many processing resources.

Figure 3:
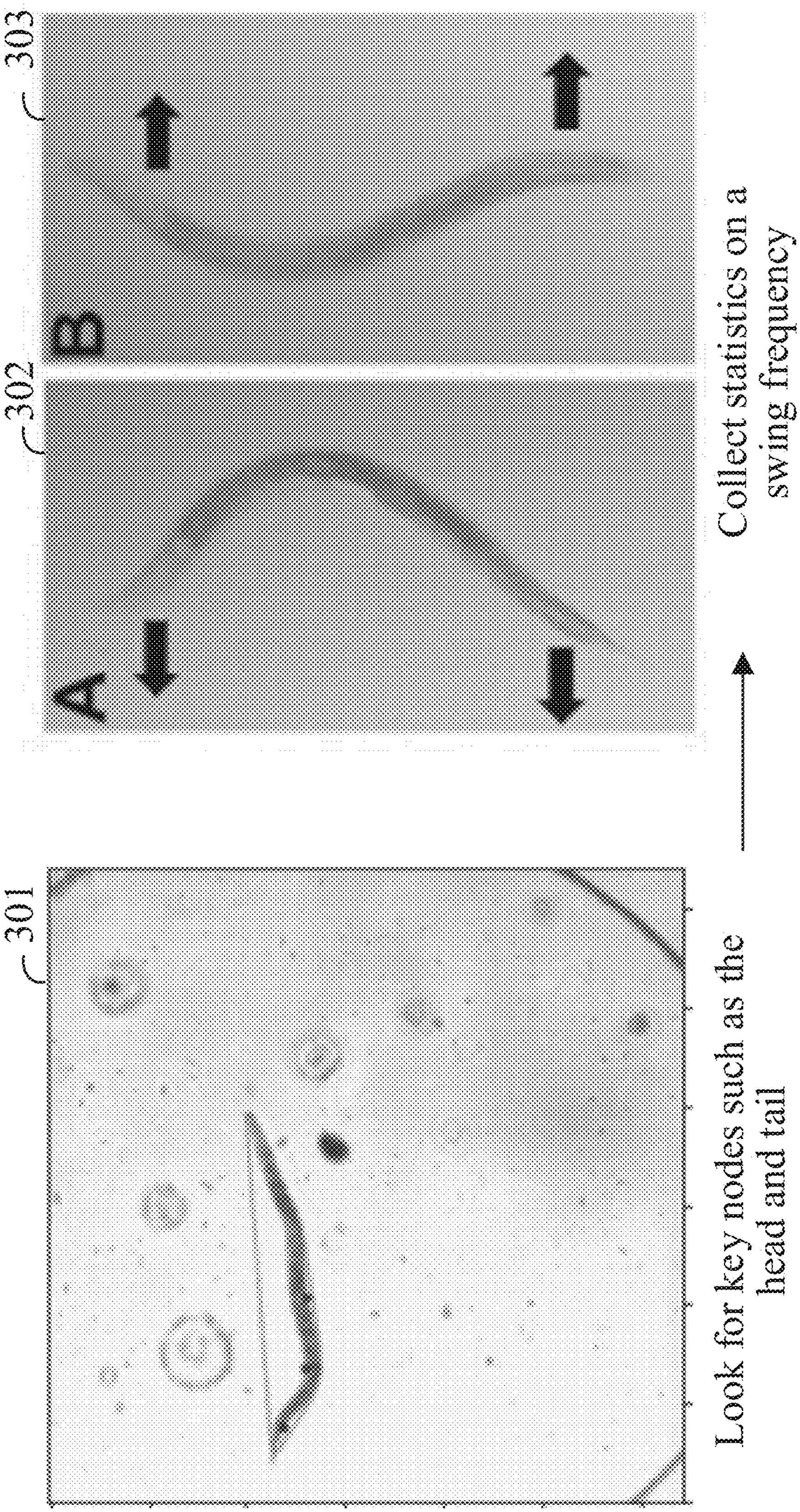
FIG. 3 is a schematic diagram of analysis of a swimming frequency of a nematode according to an embodiment of this application.

In a conventional kinematic parameter analysis manner, a swimming frequency and a body bending frequency of a nematode are usually analyzed. This mainly depends on counting with naked eyes of a technician. The swimming frequency of the nematode refers to a quantity of times that the head of the nematode swings in 1 min (minute) (that the head of the nematode swings from one side to the other and then swings back is defined as one time of head swing), and the body bending frequency means that motion of one wavelength relative to a long axis of the body is defined as one time of body bending. FIG. 3 is a schematic diagram of analysis of a swimming frequency of a nematode according to an embodiment of this application. When observing motion of a nematode under a microscope, a technician may look for key nodes such as the head and tail of the nematode from an observation image 301. Next, a process in which the nematode moves from a form A in an image 302 to a form B in an image 303 is considered as one time of head swing of the nematode, so that the technician manually counts a quantity of head swing times of the nematode in a period of time. Then, the quantity of head swing times is divided by a quantity of minutes consumed for the counting to obtain the swimming frequency of the nematode.

In the foregoing conventional kinematic parameter analysis manner, because of a fast motion speed of the nematode, problems such as wrong counting is easy to occur during manual counting, extremely high labor costs are consumed, and analysis efficiency is low. Moreover, the swimming frequency and the body bending frequency of the nematode can be used only for simple motion evaluation on the nematode, but not for deep morphological measurement and kinematics analysis, and has poor analysis accuracy.

In view of this, the embodiments of this application provide a deep learning-based microscopic image analysis method. Especially for a microscopic image that includes a target object (for example, a nematode) and that is obtained by a microscope CCD, a complete set of deep learning-based image analysis manners are designed from multi-target (such as multi-nematode) instance segmentation to skeleton extraction and then to principal component analysis. Manual operations by technicians are not needed in intermediate steps. This provides fast and efficient basic results for subsequent counting, segmentation, morphological measurement, and kinematic analysis.

Descriptions are provided by using an example in which the target object is the nematode. For one thing, the embodiments of this application provide a complete set of deep learning-based nematode image analysis frameworks, and manual operations by technicians are not needed in intermediate steps of the frameworks. This greatly reduces labor costs and improves analysis efficiency. For another thing, the overall image analysis framework relates to an instance segmentation method that can process a plurality of overlapping nematodes, so that an instance segmentation effect when the plurality of nematodes overlap can be optimized, and nematode counting can be simultaneously performed after the instance segmentation is completed. For still another thing, the overall image analysis framework relates to a deep learning-based skeleton extraction method, so that a skeleton image without noise such as burr or branches can be directly outputted, and skeleton extraction when the nematode twists can be performed. In addition, the head and tail of the nematode can be automatically distinguished by a machine based on the extracted skeleton image. For further another thing, the overall image analysis framework relates to a principal component-based analysis method. In the principal component-based analysis, principal component decomposition can be performed on an extracted nematode skeleton, and a kinematics parameter and the like of the nematode can be quickly and conveniently analyzed by using a principal component coefficient, namely, an eigenvalue. Generally, according to the method provided in the embodiments of this application, conventional procedures for the microscopic image of the nematode are optimized, so that the microscopic image of the nematode can be automatically processed, to provide fast and efficient basic results for subsequent downstream tasks such as counting, segmentation, morphological measurement, and kinematic analysis.

Figure 4:
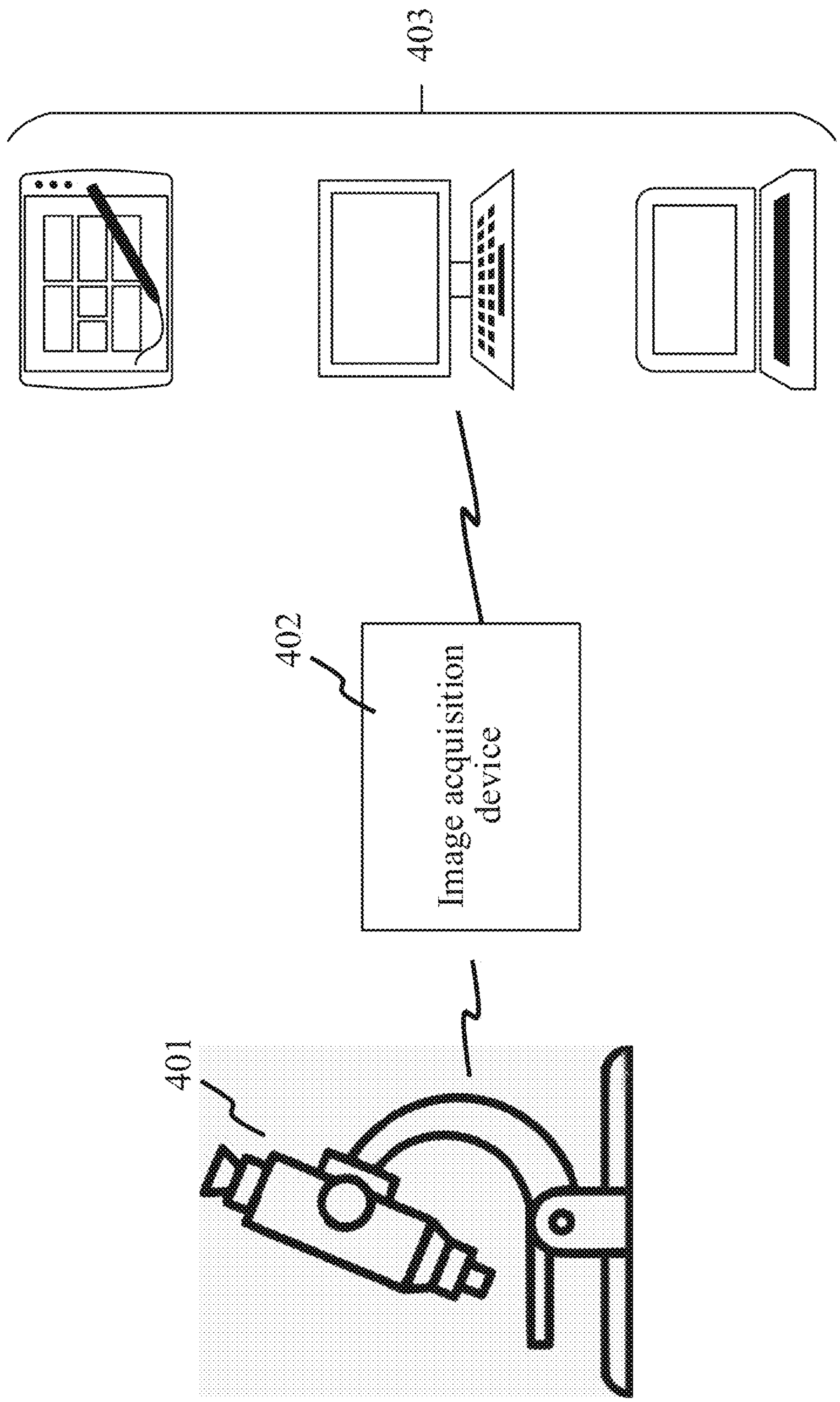
FIG. 4 is a schematic diagram of an implementation environment of a microscopic image processing method according to an embodiment of this application.

FIG. 4 is a schematic diagram of an implementation environment of a microscopic image processing method according to an embodiment of this application. Refer to FIG. 4. The implementation environment includes a microscope 401, an image acquisition device 402, and a computer device 403. The following provides descriptions.

The microscope 401 may be a digital microscope, namely, a video microscope, and can convert, through digital-to-analog conversion, a physical image observed through the microscope 401 into an image on a screen of the microscope 401 or the computer device 403 externally connected to the microscope 401. The digital microscope is a product successfully developed by combining an elite optical microscope technology, an advanced photoelectric conversion technology, and a liquid crystal screen technology perfectly.

The image acquisition device 402 is configured to acquire the physical image observed through the microscope 401. For example, when an object to be observed is a target object, the image acquisition device 402 acquires a microscopic image including the target object. Descriptions are provided by using an example in which the target object is a nematode. Because nematodes in a petri dish are cultured in batches, when the nematodes are observed through the microscope 401, there may be a plurality of nematodes under an ocular lens, these nematodes may overlap, and a single nematode may also self-overlap due to twisting.

The image acquisition device 402 usually includes a CCD image sensor connected to the microscope 401, where the CCD image sensor is also referred to as a CCD photosensitive element. A CCD is a semiconductor device, and can convert, into a digital signal, an optical image observed through the microscope 401. In other words, a light beam emitted from a photographed object (namely, the target object) is formed on a light receiving surface of the CCD through an optical system (for example, an object lens and the ocular lens of the microscope), brightness of an image is photoelectrically converted into a quantity of electric charges, and then the quantity of electric charges is sequentially read as an electrical signal. A tiny photosensitive substance implanted on the CCD is referred to as a pixel. More pixels included on the CCD indicates higher picture resolution of the CCD. The CCD acts as a film, but converts an image pixel into a digital signal. There are many neatly arranged capacitors on the CCD, where the capacitors can sense light and convert an image into a digital signal. Controlled by an external circuit, each small capacitor can transfer a charge of the capacitor to an adjacent capacitor.

The computer device 403 is connected to the image acquisition device 402 or the microscope 401 carrying the image acquisition device 402. The computer device 403 may be a terminal. An application supporting display of the microscopic image is installed and runs on the terminal. The terminal receives the microscopic image acquired by the image acquisition device 401 and displays the microscopic image on a display screen of the terminal.

In some embodiments, after the terminal receives and displays the microscopic image, the terminal locally supports the microscopic image processing method in the embodiments of this application, so that the terminal can locally process the microscopic image and display a processing result of the microscopic image. In some other embodiments, the terminal may be directly or indirectly connected to a server through wired or wireless communication. A connection mode is not limited herein in this embodiment of this application. The terminal sends, to the server, the microscopic image sent by the image acquisition device 402. The server processes the microscopic image and returns a processing result to the terminal. The terminal displays the received processing result on the display screen. In some embodiments, the server undertakes primary image processing work, and the terminal undertakes secondary image processing work. Alternatively, the server undertakes secondary image processing work, and the terminal undertakes primary image processing work. Alternatively, a distributed computing architecture is adopted between the server and the terminal for collaborative image processing.

In an exemplary scenario, the server trains a bilayer instance segmentation model, a skeleton extraction model, a head-tail recognition model, and the like required by the microscopic image processing method in the embodiments of this application. Then, the server delivers the trained bilayer instance segmentation model, skeleton extraction model, and head-tail recognition model to the terminal, so that the terminal can locally support the foregoing microscopic image processing method.

In some embodiments, the server includes at least one of one server, a plurality of servers, a cloud computing platform, or a virtualized center. For example, the server is an independent physical server, a server cluster or a distributed system including a plurality of physical servers, or a cloud server that provides basic cloud computing services such as a cloud service, a cloud database, cloud computing, a cloud function, cloud storage, a network service, cloud communication, a middleware service, a domain name service, a security service, a content delivery network (CDN), big data, and an artificial intelligence platform.

In some embodiments, the terminal is a smartphone, a tablet computer, a notebook computer, a desktop computer, a smart speaker, a smartwatch, a moving picture experts group audio layer III (MP3) player, a moving picture experts group audio layer IV (MP4) player, an e-book reader, or the like, but is not limited thereto.

A person skilled in the art can learn that there may be more or fewer terminals. For example, there may be only one terminal, or may be dozens or hundreds of terminals or more. A quantity of terminals and device types of the terminals are not limited in this embodiment of this application.

The following describes a basic procedure for the microscopic image processing method in the embodiments of this application.

Figure 5:
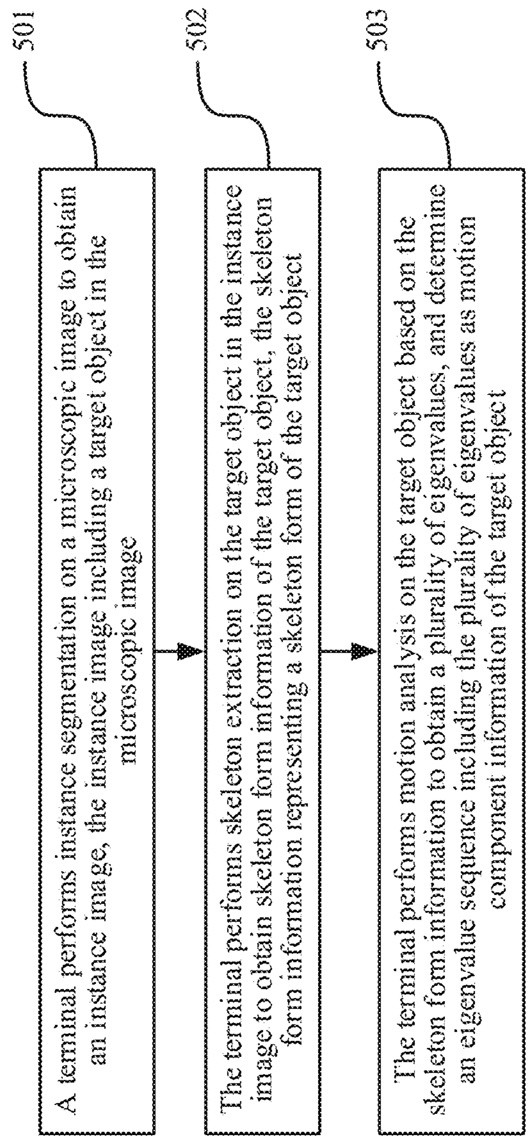
FIG. 5 is a flowchart of a microscopic image processing method according to an embodiment of this application.

FIG. 5 is a flowchart of a microscopic image processing method according to an embodiment of this application. Refer to FIG. 5. The microscopic image processing method is performed by a computer device, and descriptions are provided by using an example in which the computer device is a terminal. This embodiment includes the following steps:

501: The terminal performs instance segmentation on a microscopic image to obtain an instance image, the instance image including a target object in the microscopic image.

The terminal is a computer device configured to store and process the microscopic image. In this embodiment of this application, descriptions are provided by using an example in which the computer device is the terminal. In some embodiments, the computer device may alternatively be provided as a server. This is not specifically limited in this embodiment of this application.

The microscopic image is an optical image that is acquired by a CCD image sensor of a microscope and that is obtained by observing an object to be observed. For example, the microscope carries the CCD image sensor. As an example of an image acquisition device, the CCD image sensor can convert the optical image observed by the microscope into an electrical signal, and form the microscopic images that can be read and displayed by the terminal. After generating the microscopic image, the CCD image sensor sends the microscopic image to the terminal.

In some embodiments, the terminal receives the microscopic images sent by the CCD image sensor of the microscope. This microscopic image may be a single microscopic image sent by the CCD image sensor or any image frame in a consecutive observed video stream sent by the CCD image sensor. A type of the microscopic image is not specifically limited in this embodiment of this application.

Because the microscope may continuously observe the target object, the CCD image sensor may acquire a segment of consecutive image frames (forming an observed video stream). Then, the CCD image sensor sends the acquired image frames to the terminal. During transmission, the image frames may be transmitted frame by frame in sequence, or may be divided into multiple video segments for transmission. A transmission mode is not specifically limited in this embodiment of this application.

In some embodiments, in addition to directly obtaining the microscopic image sent by the CCD image sensor of the microscope, the terminal may alternatively process a locally stored microscopic image, or process a microscopic image downloaded from the server. A source of the microscopic image is not specifically limited in this embodiment of this application.

In some embodiments, after the terminal obtains the microscopic image, because the microscopic image is the optical image obtained by the microscope by observing the target object to be observed, the microscopic image necessarily includes one or more target objects. For deep analysis of the target object, the terminal performs instance segmentation on the microscopic image on the basis of the microscopic image, to obtain, through segmentation, each target object included in the microscopic image, and obtain, as a single-instance segmentation result of the microscopic image, the instance image including the single target object. For example, an instance image of each target object includes one contour image and one mask image of the target object. The contour image of the target object indicates an edge and a shape of the single target object in the microscopic image. The mask image of the target object indicates a position of and a region occupied by the single target object in the microscopic image. The foregoing instance segmentation refers to image instance segmentation, and is further refinement on the basis of semantic segmentation, to separate foreground and background of an object and implement pixel-level object separation, thereby obtaining different object instances in the same class through segmentation. The instance may be an organ, a tissue, a cell, or the like. In this embodiment of this application, the instance segmentation is used for obtaining the target object, namely, a nematode, through segmentation.

Descriptions are provided by using an example in which the target object is the nematode. Because nematodes in a petri dish are cultured in batches, when the nematodes in the petri dish are observed through the microscope, a plurality of nematodes may be observed under an ocular lens, these nematodes may overlap, and a single nematode may also self-overlap due to twisting. In this embodiment of this application, during the instance segmentation, a good instance segmentation effect can be achieved for complex scenarios in which a plurality of target objects overlap or a single target object twists. A specific instance segmentation manner is described in detail in the next embodiment, and details are not described herein.

502: The terminal performs skeleton extraction on the target object in the instance image to obtain skeleton form information of the target object, the skeleton form information representing a skeleton form of the target object.

In some embodiments, after the terminal performs instance segmentation for each target object in the microscopic image, the terminal may output an instance image for each target object. In some embodiments, the instance image of each target object includes one contour image and one mask image, and the skeleton extraction may be performed for the mask image of each target object to obtain skeleton form information of the current target object by using a skeleton extraction algorithm. When a plurality of target objects are involved, it is necessary to extract skeleton form information of each target object. For example, both contour image and the mask image are binary images. A contour pixel and a non-contour pixel have different values in the contour image. A pixel belonging to the target object and a pixel not belonging to the target object have different values in the mask image.

For example, in the contour image, a pixel with a value of 1 is the contour pixel, and a pixel with a value of 0 is the non-contour pixel. Alternatively, a pixel with a value of 0 is the contour pixel, and a pixel with a value of 1 is the non-contour pixel. This is not specifically limited in this embodiment of this application. The contour pixel is a pixel representing a contour (namely, an edge) of the target object, and the non-contour pixel is a pixel not representing the contour of the target object.

For example, in the mask image, a pixel with a value of 1 is the pixel belonging to the target object, and a pixel with a value of 0 is the pixel not belonging to the target object (may be a background pixel or a pixel of another target object). Alternatively, a pixel with a value of 0 is the pixel belonging to the target object, and a pixel with a value of 1 is the pixel not belonging to the target object. This is not specifically limited in this embodiment of this application.

In some embodiments, for each target object, the terminal runs the skeleton extraction algorithm on a mask image of the target object to output skeleton form information of the target object. In some embodiments, the skeleton form information at least includes a skeleton form image generated based on the mask image, and a skeleton of the target object in the skeleton form image has a single-layer pixel width. For example, the skeleton form image is also a binary image. In the skeleton form image, a skeleton pixel and a non-skeleton pixel have different values.

For example, in the skeleton form image, a pixel with a value of 1 is a skeleton pixel, and a pixel with a value of 0 is a non-skeleton pixel. Alternatively, a pixel with a value of 0 is a skeleton pixel, and a pixel with a value of 1 is a non-skeleton pixel. This is not limited in this embodiment of this application. The skeleton pixel is a pixel representing the skeleton of the target object, and the non-skeleton pixel is a pixel not representing the skeleton of the target object.

In this case, the skeleton pixels in the skeleton form image can form the skeleton that is of the target object and that has the single-layer pixel width. A form of the skeleton represents a skeleton form of the target object in the microscopic image.

In this embodiment of this application, the skeleton extraction algorithm is applied for each instance image that is of the target object and that is obtained through segmentation on the basis of the instance segmentation result, to extract the skeleton form image. This helps kinematics analysis on the skeleton form image of the target object, to improve analysis efficiency of the kinematics analysis without manual participation or naked-eye counting.

503: The terminal performs motion analysis on the target object based on the skeleton form information to obtain a plurality of eigenvalues, and determine an eigenvalue sequence including the plurality of eigenvalues as motion component information of the target object.

In some embodiments, the skeleton form information that is of each target object and that is obtained in step 502 at least includes the skeleton form image of each target object.

Next, the terminal performs motion analysis on the skeleton form image, so that the current skeleton form of the target object is decomposed into a combination of multiple preset motion states; and for each preset motion state, an eigenvalue representing contribution of the motion state during the decomposition can be determined. The eigenvalue represents a weighting coefficient that needs to apply to the motion state to synthesize the current skeleton form of the target object, and a motion state with a high eigenvalue may be used as a main component of the current skeleton form. An eigenvalue of each motion state as the main component can form an eigenvalue sequence, where the eigenvalue sequence may be used as the motion component information of the target object. A detailed motion analysis manner is described in the following embodiment, and details are not described herein.

In this embodiment of this application, the kinematics analysis is performed on the skeleton form image of each target object, so that the current skeleton form of the target object can be decomposed into the combination of the plurality of preset motion states. In this way, a skeleton form in any shape can be represented as motion synthesized by weighting the plurality of preset motion states by using the plurality of eigenvalues. The foregoing processing manners implements deeper and finer kinematics analysis of the target object. Especially for a case in which the target object is a nematode, analysis of a swimming frequency and a body bending frequency of the nematode is not limited to naked-eye counting. Instead, more accurate and more efficient kinematics analysis can be performed for the nematode without manual intervention.

Any combination of the foregoing optional technical solutions may be applied to obtain an optional embodiment of the present disclosure. Details are not described herein.

According to the method provided in this embodiment of this application, the instance segmentation is performed on the target object included in the microscopic image, to determine the instance image of each target object, namely, the single-instance segmentation result. The skeleton form information is extracted from the single-instance segmentation result, to perform motion analysis and motion component decomposition on the basis of the skeleton form information, so that the current complex skeleton form of each target object can be decomposed into the combination of the plurality of preset motion states. The whole processing procedure can be automatically implemented by a machine without manual intervention. This greatly reduces labor costs and improves analysis efficiency. In addition, deep morphological measurement and kinematics analysis can be performed based on the outputted motion component information, so that accuracy of analyzing the target object is also improved.

The following describes a detailed procedure for the microscopic image processing method in the embodiments of this application.

Figure 6:
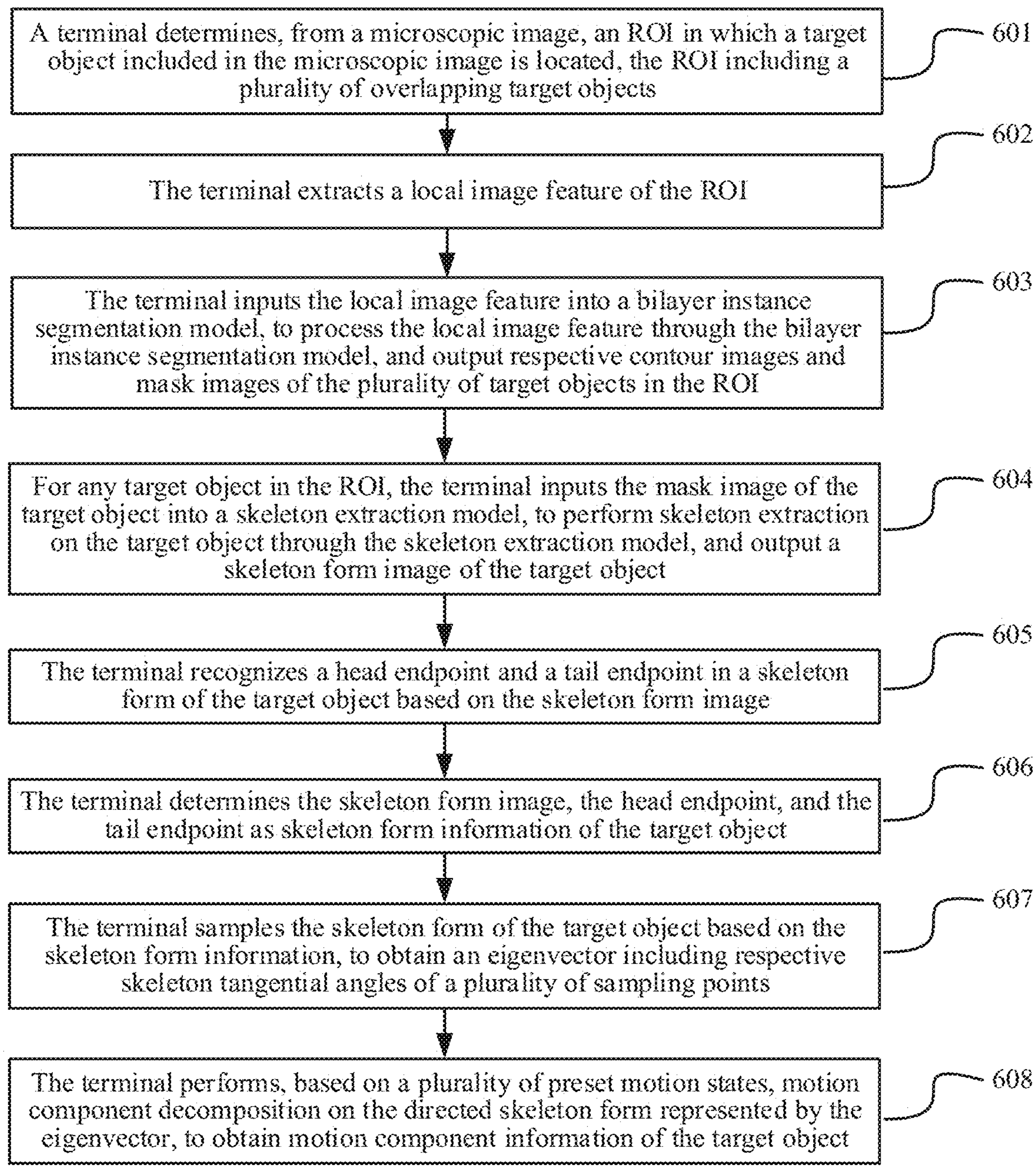
FIG. 6 is a flowchart of a microscopic image processing method according to an embodiment of this application.

FIG. 6 is a flowchart of a microscopic image processing method according to an embodiment of this application. Refer to FIG. 6. The microscopic image processing method is performed by a computer device, and descriptions are provided by using an example in which the computer device is a terminal. This embodiment includes the following steps:

601: The terminal determines, from a microscopic image, a ROI in which a target object included in the microscopic image is located, the ROI including a plurality of overlapping target objects.

In some embodiments, the terminal obtains the microscopic image in the manner described in step 501. After obtaining the microscopic image, for any microscopic image, the terminal may further input the microscopic image into an object detection model, to perform object detection (also referred to as object detection or object detection) on each target object in the microscopic image through the object detection model. The object detection model outputs position information of a candidate frame of the ROI in the microscopic image. For example, the position information includes: vertex coordinates (x, y) at an upper left corner of the candidate frame, and the width w and the height h of the candidate frame. In other words, the position information is quad data in a form of (x, y, w, h). Alternatively, the candidate frame may be located by using vertex coordinates at a lower left corner, an upper right corner, or a lower right corner. This is not specifically limited in this embodiment of this application.

In some embodiments, the object detection model may be any machine learning model that supports object detection. For example, the object detection model may be: Regions with CNN features (R-CNN, which is for CNN-based regional object detection, where CNN refers to convolutional neural network), Fast R-CNN, Faster R-CNN, or Fully Convolutional One-Stage (FCOS). A structure of the object detection model is not specifically limited in this embodiment of this application.

In the foregoing process, the ROI including the target object is extracted from the microscopic image, so that subsequent instance segmentation, skeleton extraction, and motion analysis can be performed only on the ROI including the target object. In this way, the instance segmentation, skeleton extraction, and motion analysis do not need to be performed on some background regions or regions that do not include the target object. The foregoing processing manner can not only avoid noise interference caused by a non-ROI and improve accuracy of processing the ROI, but also reduce a processing resource occupied by a processing operation on the non-ROI, shorten duration for processing the microscopic image, and improve efficiency of processing the microscopic image.

Because the target object may be a living research object such as a microorganism or a nematode, the ROI may include one or more target objects. A processing procedure for a single target object is simple, and a target object of a single instance can be obtained through segmentation directly by using some conventional instance segmentation algorithms (for example, by successively running the Otsu's algorithm, distance transformation, and a watershed algorithm). However, a processing procedure for a plurality of target objects is complicated. Because the plurality of target objects may overlap each other, that the ROI includes the plurality of target objects is used as an example in this embodiment of this application for description. In addition, even if the ROI includes only a single target object, the single target object may self-overlap due to twisting, and the conventional instance segmentation algorithm has poor instance segmentation accuracy in the case of self-overlapping. The processing procedure provided in this embodiment of this application can improve instance segmentation accuracy not only in the scenario in which the plurality of target objects overlap each other but also in the scenario in which the single target object self-overlaps. 602: The terminal extracts a local image feature of the ROI.

In some embodiments, the terminal may input the microscopic image into a feature extraction model, to extract a global image feature of the microscopic image through the feature extraction model. Next, the terminal can determine the local image feature of the ROI from the global image feature by using the position information that is of the ROI and that is obtained in step 601. For example, when the position information of the ROI is (x, y, w, h), assuming that (x, y) is the vertex coordinates at the upper left corner, it is only necessary to scale the global image feature to the same size as the microscopic image (if the feature extraction model directly outputs a global image feature of the same size, this scaling step is not needed). Then, a feature point with the coordinates (x, y) is found from the global image feature. A ROI candidate frame with the width w and the height h is determined by using the feature point as a vertex at the upper left corner. Next, each feature point included in a region selected by the ROI candidate frame in the global image feature is determined as the local image feature of the ROI. In other words, based on the ROI candidate frame, the terminal can truncate the global image feature to obtain a local image feature of a region covered by the ROI.

For example, the foregoing feature extraction model includes a residual network (Resnet) and a feature pyramid network (FPN). A residual sub-network is used for extracting a pixel related feature of an inputted image. A feature pyramid sub-network is used for extracting image pyramid features of an inputted image in different scale spaces.

In some embodiments, the residual network includes a plurality of hidden layers, and the plurality of hidden layers are residually connected. For example, when all adjacent hidden layers are residually connected, an output of a current hidden layer is spliced with an input of the current hidden layer to be inputted into a next hidden layer. For example, an output of the second hidden layer is spliced with an input of the second hidden layer (namely, an output of the first hidden layer) to be inputted into the third hidden layer. For another example, when the residual connection is adopted at an interval of one hidden layer, an output of a current hidden layer is spliced with an input of a previous hidden layer to be inputted into a next hidden layer. For example, an output of the third hidden layer is spliced with an input of the second hidden layer (namely, an output of the first hidden layer) to be inputted into the fourth hidden layer. A structure of the residual sub-network is not specifically limited in this embodiment of this application. In an example, the residual sub-network may be a deep residual network such as a Resnet-34 network, a Resnet-50 network, or a Resnet-101 network.

In some embodiments, after an original image feature is extracted through the residual network, the original image feature is inputted into the feature pyramid network, to upsample the original image feature level by level through the feature pyramid network to obtain a feature pyramid in a series of different scale spaces. Then, features of different scales included in the feature pyramid are fused to obtain a final global image feature.

In the foregoing process, a series of features with different scales can be obtained by pyramiding the original image feature extracted through the residual network. The features with different scales are fused, and the obtained global image feature can transfer a feature at an upper layer (in other words, with a smallest scale) to the original image feature, to supplement semantics of the original image feature at a bottom layer (in other words, with a largest scale). In the foregoing processing manner, the global image feature with high resolution and strong semantics can be obtained. This is beneficial to detection of small targets such as the nematode.

In some embodiments, the global image feature may alternatively be extracted by only using the residual network. In other words, the feature extraction model is the residual network. The terminal directly uses an original image feature extracted through the residual network as the global image feature, and then truncates the global image feature to obtain the local image feature. This can simplify a global image feature extraction procedure and save processing resources of the terminal. In the foregoing process, the global image feature is extracted through the feature extraction model, and then the global image feature is truncated to obtain the local image feature. This can well preserve an image feature at an edge of the ROI. Because the image feature at the edge is closely related to a pixel in the adjacent non-ROI, the local image feature with a good expressive ability can be extracted.

In some other embodiments, after the position information of the ROI is obtained through step 601, the ROI may be first obtained through truncation from the microscopic image. Then, only the ROI is inputted into the feature extraction model, to directly extract the local image feature of the ROI through the feature extraction model. In the foregoing processing manner, feature extraction can be performed only on the ROI, so that the global image feature of the entire microscopic image does not need to be extracted. This can greatly save processing resources of the terminal.

603: The terminal inputs the local image feature into a bilayer instance segmentation model, to process the local image feature through the bilayer instance segmentation model, and output respective contour images and mask images of the plurality of target objects in the ROI.

The bilayer instance segmentation model is used for respectively establishing layers for different objects to obtain an instance segmentation result of each object. In other words, the bilayer instance segmentation model is used for respectively establishing layers for different objects to obtain an instance image of each object. The instance image of each object includes a contour image and a mask image of the object.

In some embodiments, after the terminal extracts the local image feature of the ROI in step 602, the terminal inputs the local image feature into the bilayer instance segmentation model. If the ROI includes a plurality of target objects, the bilayer instance segmentation model respectively establishes layers for the different target objects to output an instance image (namely, an instance segmentation result) for each target object. In some embodiments, the instance image of each target object includes a contour image and a mask image of the target object, to represent a contour of and a mask occupied by the target object.

In some embodiments, both the contour image and the mask image are binary images. A contour pixel and a non-contour pixel have different values in the contour image, and a pixel belonging to the target object and a pixel not belonging to the target object have different values in the mask image. For example, in the contour image, a pixel with a value of 1 is the contour pixel, and a pixel with a value of 0 is the non-contour pixel. Alternatively, a pixel with a value of 0 is the contour pixel, and a pixel with a value of 1 is the non-contour pixel. This is not specifically limited in this embodiment of this application. For example, in the mask image, a pixel with a value of 1 is the pixel belonging to the target object, and a pixel with a value of 0 is the pixel not belonging to the target object (may be a background pixel or a pixel of another target object). Alternatively, a pixel with a value of 0 is the pixel belonging to the target object, and a pixel with a value of 1 is the pixel not belonging to the target object. This is not specifically limited in this embodiment of this application.

In this embodiment of this application, for case of description, the instance segmentation procedure is described by using an example in which the ROI includes two overlapping target objects. To distinguish the two target objects in the ROI, a target object at a top layer is referred to as an occluder, and a target object at a bottom layer is referred to as an occludee. Obviously, in an overlapping region of the two target objects, the occluder is located at the top layer and covers a part of the body of the occludee at the bottom layer.

In some embodiments, the bilayer instance segmentation model includes an occluder layer network and an occludee layer network. The occluder layer network is used for extracting a contour and a mask of the occluder at the top layer. The occludee layer network is used for extracting a contour and a mask of the occludee at the bottom layer. The occluder layer network and the occludee layer network are deployed in the bilayer instance segmentation model in a cascaded manner, and an output of the occluder layer network is an input of the occludee layer network.

Figure 7:
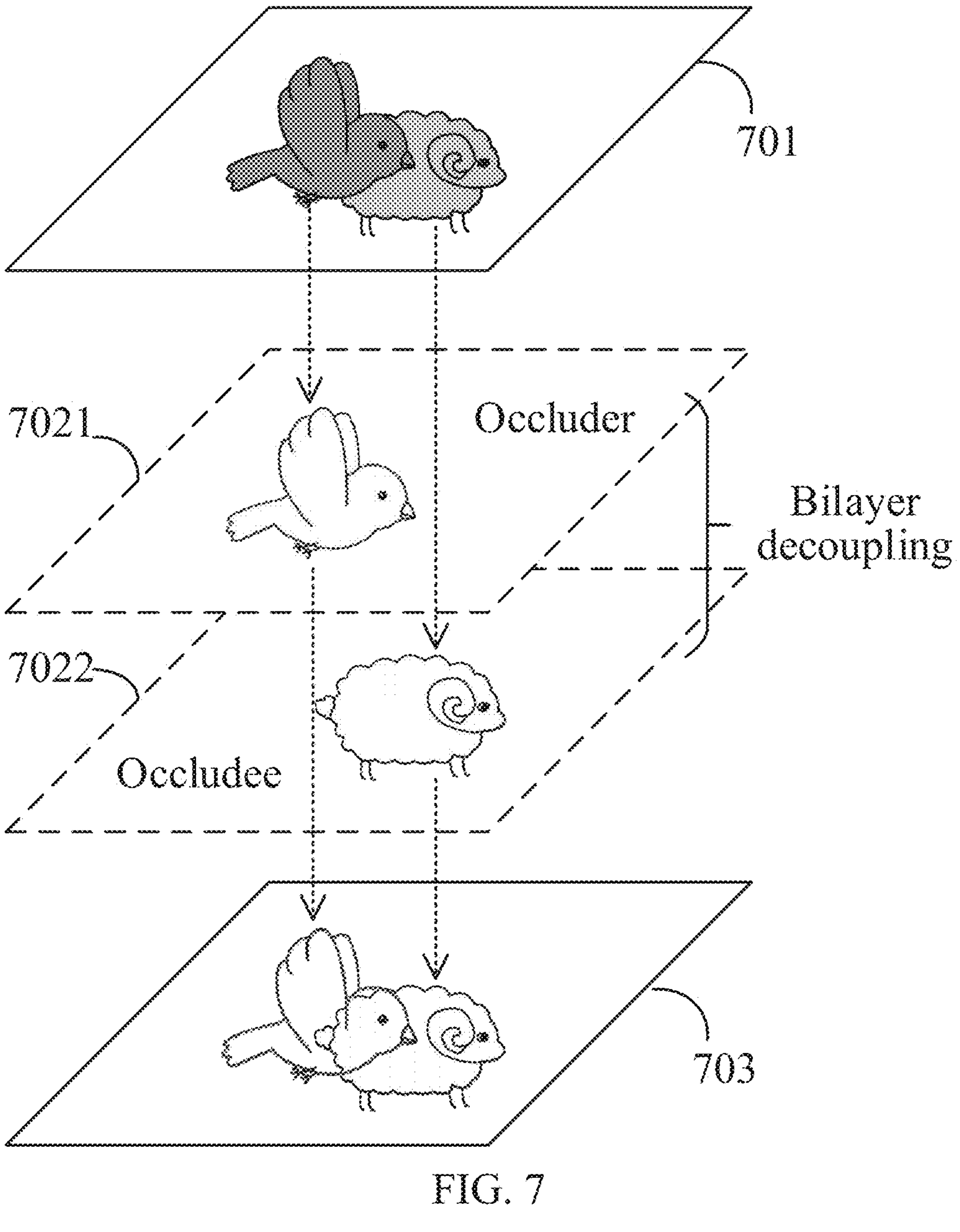
FIG. 7 is a schematic diagram of a segmentation principle of a bilayer instance segmentation model according to an embodiment of this application.

FIG. 7 is a schematic diagram of a segmentation principle of the bilayer instance segmentation model according to this embodiment of this application. As shown in FIG. 7, for any inputted image 701 (for example, the inputted image is: a microscopic image or an ROI of the microscopic image), when the ROI includes two overlapping target objects, the bilayer instance segmentation model respectively establishes layers for an occluder at a top layer and an occludee at a bottom layer to perform instance segmentation. For example, a contour image and a mask image of the occluder are extracted from a top layer 7021. A contour image and a mask image of the occludee are extracted from a bottom layer 7022. The top layer 7021 and the bottom layer 7022 can implement bilayer decoupling between the occluder and the occludee, to finally output respective instance segmentation results, namely, instance images 703, for the different target objects (namely, different instances). For example, the contour image and the mask image are respectively outputted for the occluder and the occludec.

Figure 8:
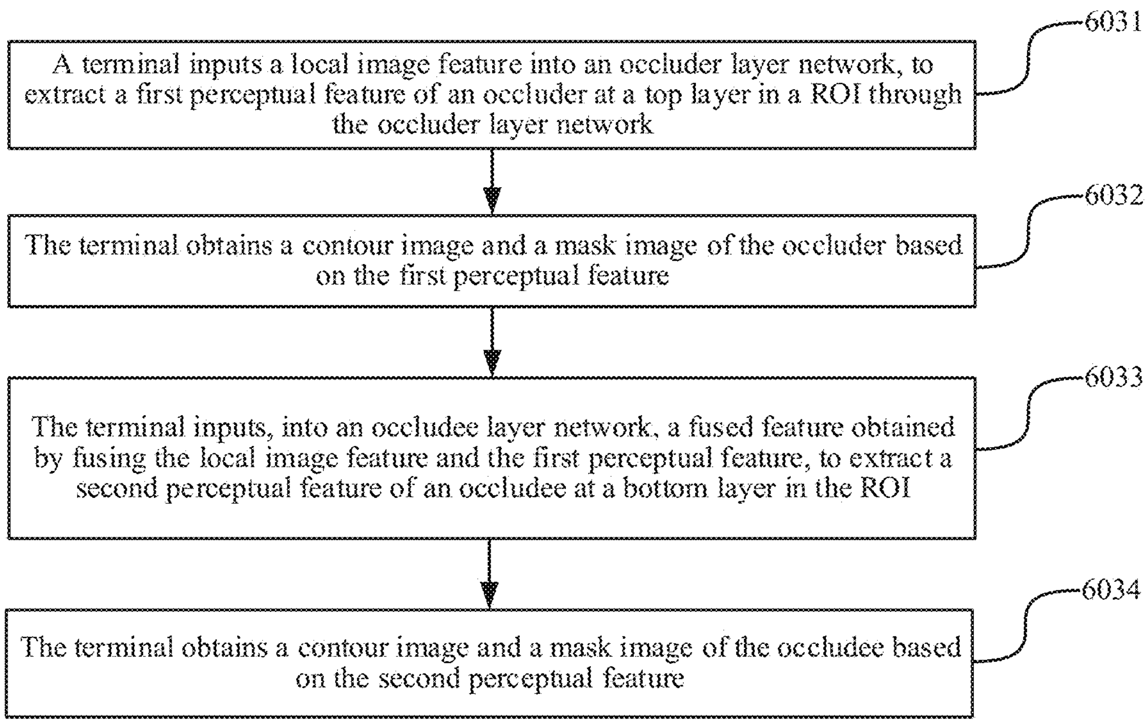
FIG. 8 is a flowchart of an instance segmentation manner for two target objects according to an embodiment of this application.

On the basis of the bilayer instance segmentation model with the foregoing structure, an instance segmentation manner for the two target objects is described as follows. FIG. 8 is a flowchart of the instance segmentation manner for the two target objects according to this embodiment of this application. As shown in FIG. 8, the instance segmentation manner includes the following steps 6031 to 6034.

6031: The terminal inputs the local image feature into the occluder layer network, to extract a first perceptual feature of the occluder at the top layer in the ROI through the occluder layer network.

The first perceptual feature represents an image feature of the occluder on an instance segmentation task.

In some embodiments, the occluder layer network is used for explicitly modeling the contour and the mask of the occluder in the ROI. In some embodiments, the occluder layer network includes at least one first convolution layer, at least one first graph convolutional network (GCN) layer and at least one second convolution layer. Adjacent layers among the first convolution layer, the first graph convolution layer, and the second convolution layer are connected in series. The series connection means that a feature outputted from a previous layer is used as an inputted signal of a current layer. The first graph convolution layer is simplified based on a non-local attention mechanism, and may also be referred to as a non-local layer. To reduce a quantity of parameters of the model, the graph convolution layer is implemented through an operation by a non-local operator. Each pixel is a graph node, and an attention weight constitutes a node connection between nodes. Based on the occluder layer network with the foregoing structure, step 6031 may be implemented by the following steps A1 to A3.

A1: The terminal inputs the local image feature into the first convolution layer of the occluder layer network, to perform a convolution operation on the local image feature through the first convolution layer to obtain an initial perceptual feature.

In some embodiments, the local image feature that is of the ROI and that is extracted in step 602 is inputted into the first convolution layer of the occluder layer network of the bilayer instance segmentation model, to perform the convolution operation on the local image feature through the first convolution layer. For example, a convolution kernel with a size of 3×3 performs the convolution operation on the local image feature, to output the initial perceptual feature of the occluder.

A2: The terminal inputs the initial perceptual feature into the first graph convolution layer of the occluder layer network, to perform a convolution operation on the initial perceptual feature through the non-local operator at the first graph convolution layer to obtain a graph convolution feature.

In some embodiments, the initial perceptual feature outputted in step A1 is further inputted into the first graph convolution layer of the occluder layer network, to implement the graph convolution layer through the non-local operator at the first graph convolution layer. For example, the first graph convolution layer relates to three convolution layers with a convolution kernel whose size is 1×1 and one Softmax (exponential normalization) operator. For case of description, the three convolution layers are referred to as a $\phi$ convolution layer, a $\theta$ convolution layer, and a $\beta$ convolution layer respectively. The terminal inputs the initial perceptual feature into the $\phi$ convolution layer, the $\theta$ convolution layer, and the $\beta$ convolution layer separately, and the convolution kernel with the size of 1×1 performs a convolution operation on the initial perceptual feature at each convolution layer. Then, the terminal multiplies, by elements, a feature image outputted by the $\phi$ convolution layer and a feature image outputted by the $\theta$ convolution layer, to obtain a fused feature image. The terminal then exponentially normalizes the fused feature image by using the Softmax operator to obtain a normalized feature image. The terminal multiplies, by elements, the normalized feature image and a feature image outputted by the $\beta$ convolution layer, to obtain a target feature image. Then, the terminal adds the target feature image and the initial perceptual feature by elements to obtain an output result of the first graph convolution layer, namely, the graph convolution feature.

In the foregoing process, the non-local operator implements the graph convolution operation at the first graph convolution layer. This can reduce a quantity of model parameters in a graph convolution part. At the graph convolution layer based on the non-local operator, pixels in an image space can be effectively associated according to similarity of corresponding eigenvectors, to re-aggregate regional features of an inputted target. This can well solve a problem that pixels of the same object are discontinuous due to occlusion and interception in the space.

A3: The terminal inputs the graph convolution feature into the second convolution layer of the occluder layer network, to perform a convolution operation on the graph convolution feature through the second convolution layer to obtain a first perceptual feature.

In some embodiments, the graph convolution feature outputted in step A2 is inputted into one or more second convolution layers in series, to further perform the convolution operation on the graph convolution feature through the second convolution layer. For example, a convolution kernel with a size of 3×3 performs the convolution operation on the graph convolution feature, to output the first perceptual feature of the occluder.

Figure 9:
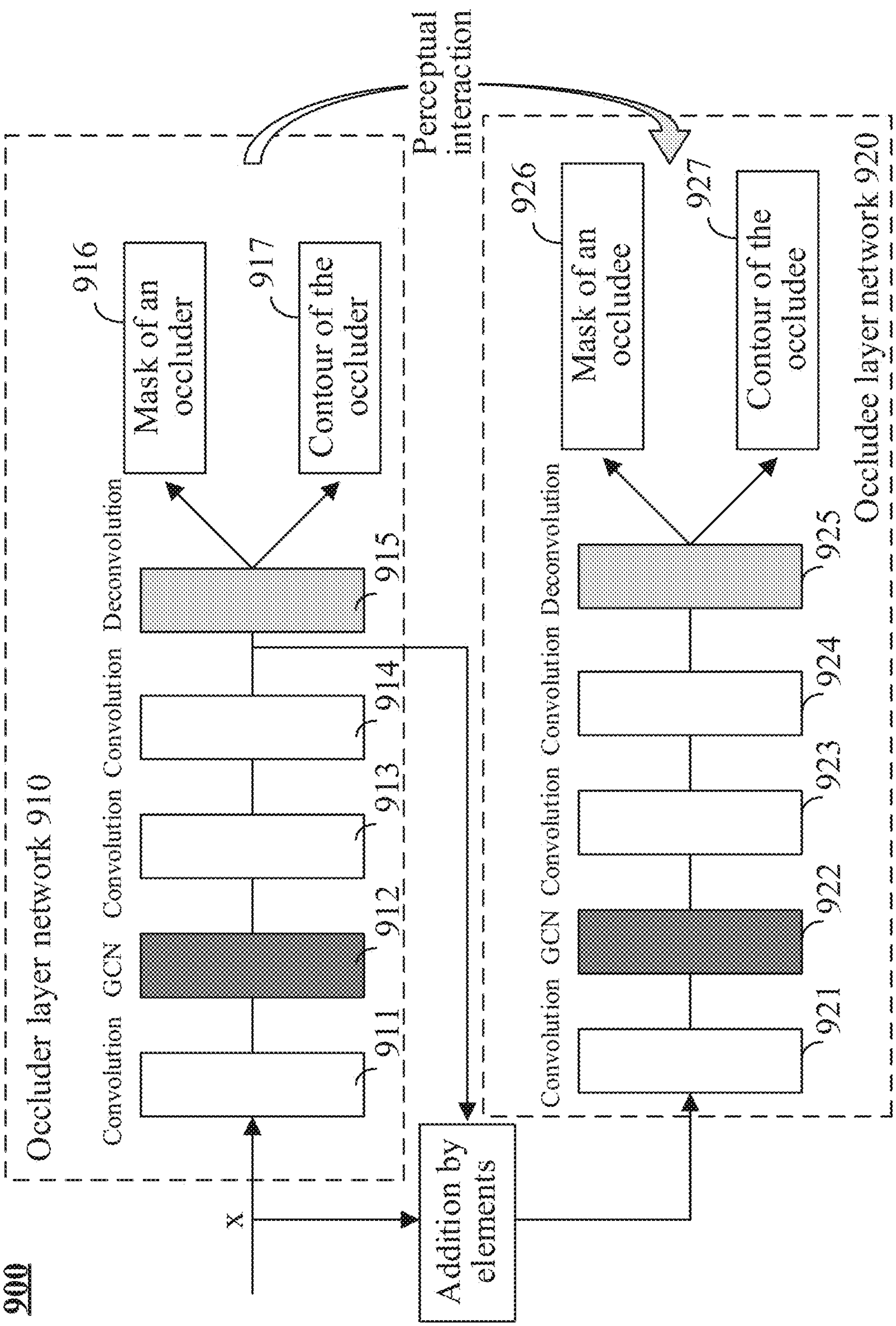
FIG. 9 is a schematic principle diagram of a bilayer instance segmentation model according to an embodiment of this application.

FIG. 9 is a schematic principle diagram of the bilayer instance segmentation model according to this embodiment of this application. As shown in FIG. 9, a bilayer instance segmentation model 900 relates to an occluder layer network 910 and an occludee layer network 920. The occluder layer network 910 includes one first convolution layer 911, one first graph convolution layer 912, and two second convolution layers 913 and 914 that are connected in series. Assuming that the local image feature that is of the ROI and that is extracted in step 602 is represented by a symbol x, the local image feature x is first inputted into the occluder layer network 910, to successively extract the initial perceptual feature through the first convolution layer 911, extract the graph convolution feature through the first graph convolution layer 912, and extract the first perceptual feature through the second convolution layers 913 and 914. The second convolution layer 914 outputs the first perceptual feature.

In the bilayer instance segmentation model 900, a bilayer (Overlapping Bi-Layers) module for processing overlapping objects is added to Mask RCNN, to extract a local image feature x of the ROI for any single target object obtained through instance segmentation (this is equivalent to ROI pooling of the original microscopic image). Then a relationship between the occluder and the occludee is modeled through the bilayer module. The first perceptual feature of the occluder is introduced to a calculation process of a second perceptual feature of the occludee. In the foregoing processing manner, the mutual relationship between the occluder and the occludee can be better learned of, to finally output a good segmentation result in a case of multi-object overlapping.

6032: The terminal obtains the contour image and the mask image of the occluder based on the first perceptual feature.

In some embodiments, after the terminal extracts the first perceptual feature of the occluder through the occluder layer network, the terminal may perform an upsampling operation on the first perceptual feature to obtain the contour image and the mask image of the occluder. For example, the first perceptual feature is upsampled to obtain one contour image with the same size as the ROI and one mask image with the same size as the ROI. Alternatively, the first perceptual feature is upsampled to obtain one contour image with the same size as the microscopic image and one mask image with the same size as the microscopic image. This is not specifically limited in this embodiment of this application.

In some embodiments, the occluder layer network further includes one first deconvolution layer. The terminal inputs the first perceptual feature into the first deconvolution layer, to perform a deconvolution operation on the first perceptual feature at the first deconvolution layer to obtain the contour image and the mask image of the occluder. Herein, only an example in which the deconvolution operation is performed for the upsampling is used for description, and the upsampling may alternatively be implemented in another manner. This is not specifically limited in this embodiment of this application.

Still using FIG. 9 as an example, the occluder layer network 910 further includes a first deconvolution layer 915. After the first perceptual feature outputted by the second convolution layer 914 is inputted into the first deconvolution layer 915, one contour image 916 of the occluder and one mask image 917 of the occluder are outputted.

6033: The terminal inputs, into the occludee layer network, a fused feature obtained by fusing the local image feature and the first perceptual feature, to extract the second perceptual feature of the occludee at the bottom layer in the ROI.

The second perceptual feature represents an image feature of the occludec on the instance segmentation task.

In some embodiments, the occludee layer network is used for explicitly modeling the contour and the mask of the occludee in the ROI. In some embodiments, the occludee layer network includes at least one third convolution layer, at least one second graph convolution layer, and at least one fourth convolution layer. Adjacent layers among the third convolution layer, the second graph convolution layer, and the fourth convolution layer are connected in series. Based on the occludee layer network with the foregoing structure, step 6033 may be implemented by the following steps B1 to B4.

B1: The terminal fuses the local image feature and the first perceptual feature to obtain the fused feature.

In some embodiments, the terminal adds the local image feature and the first perceptual feature by elements to obtain the fused feature. Still using FIG. 9 as an example, the terminal adds, by elements, the local image feature x of the ROI and the first perceptual feature outputted by the second convolution layer 914, to obtain the fused feature. In some other embodiments, in addition to addition by elements, fusion methods such as multiplication by elements, splicing, and bilinear merging may alternatively be adopted. A fusion method is not specifically limited in this embodiment of this application.

B2: The terminal inputs the fused feature into the third convolution layer of the occludee layer network, to perform a convolution operation on the fused feature through the third convolution layer to obtain a perceptual interaction feature.

In some embodiments, the fused feature obtained in step B1 is inputted into the third convolution layer of the occludee layer network of the bilayer instance segmentation model, to perform the convolution operation on the fused feature through the third convolution layer. For example, a convolution kernel with a size of 3×3 performs the convolution operation on the fused feature, to output the perceptual interaction feature of the occludec.

In the foregoing process, because an inputted signal of the occludee layer network includes not only the local image feature but also the first perceptual feature of the occluder, perceptual interaction between the occluder and the occludee can be implemented. In other words, extracted information about the occluder and the original local image feature are combined to jointly act on modeling the contour and the mask of the occludee. Interactive perception is performed in consideration of the relationship between the occluder and the occludee, so that boundaries of adjacent instances of the occluder and the occludec can be effectively distinguished, to improve accuracy of instance segmentation on the occludec.

B3: The terminal inputs the perceptual interaction feature into the second graph convolution layer of the occludee layer network, to perform a convolution operation on the perceptual interaction feature through a non-local operator at the second graph convolution layer to obtain a graph-convolution interaction feature.

In some embodiments, the perceptual interaction feature outputted in B2 is further inputted into the second graph convolution layer of the occludee layer network, to implement the graph convolution layer through the non-local operator at the second graph convolution layer. For example, the second graph convolution layer relates to three convolution layers with a convolution kernel whose size is 1×1 and one Softmax (exponential normalization) operator. For case of description, the three convolution layers are referred to as a ϕ convolution layer, a θ convolution layer, and a β convolution layer respectively. The perceptual interaction feature is separately inputted into the ϕ convolution layer, the θ convolution layer, and the β convolution layer separately, and the convolution kernel with the size of 1×1 performs the convolution operation on the perceptual interaction feature at each convolution layer. Then, the terminal multiplies, by elements, a feature image outputted by the ϕ convolution layer and a feature image outputted by the θ convolution layer, to obtain a fused feature image. The terminal then exponentially normalizes the fused feature image by using the Softmax operator to obtain a normalized feature image. The terminal multiplies, by elements, the normalized feature image and a feature image outputted by the β convolution layer, to obtain a target feature image. Then, the terminal adds the target feature image and the perceptual interaction feature by elements to obtain an output result of the second graph convolution layer, namely, the graph-convolution interaction feature.

In the foregoing process, the non-local operator implements the graph convolution operation at the second graph convolution layer. This can reduce a quantity of model parameters in a graph convolution part. At the graph convolution layer based on the non-local operator, pixels in an image space can be effectively associated according to similarity of corresponding eigenvectors, to re-aggregate regional features of an inputted target. The foregoing processing manner can well solve a problem that pixels of the same object are discontinuous due to occlusion and interception in the space.

B4: The terminal inputs the graph-convolution interaction feature into the fourth convolution layer of the occludee layer network, to perform a convolution operation on the graph-convolution interaction feature through the fourth convolution layer to obtain the second perceptual feature.

In some embodiments, the graph-convolution interaction feature outputted in B3 is inputted into one or more fourth convolution layers in series, to further perform the convolution operation on the graph-convolution interaction feature through the fourth convolution layer. For example, a convolution kernel with a size of 3×3 performs the convolution operation on the graph-convolution interaction feature, to output the second perceptual feature of the occludec.

Still using FIG. 9 as an example, the occludee layer network 920 includes one third convolution layer 921, one second graph convolution layer 922, and two fourth convolution layers 923 and 924. The third convolution layer 921, the second graph convolution layer 922, and the fourth convolution layers 923 and 924 are connected in series. Assuming that the local image feature that is of the ROI and that is extracted in step 602 is represented by a symbol x, the local image feature x and the first perceptual feature outputted by the second convolution layer 914 in the occluder layer network 910 are added by elements to obtain the fused feature. Then, the fused feature is inputted into the occludee layer network 920, to successively extract the perceptual interaction feature through the third convolution layer 921, extract the graph-convolution interaction feature through the second graph convolution layer 922, and extract the second perceptual feature through the fourth convolution layers 923 and 924. The fourth convolution layer 924 outputs the second perceptual feature.

6034: The terminal obtains the contour image and the mask image of the occludee based on the second perceptual feature.

In some embodiments, after the terminal extracts the second perceptual feature of the occludee through the occludee layer network, the terminal may perform an upsampling operation on the second perceptual feature to obtain the contour image and the mask image of the occludee. For example, the second perceptual feature is upsampled to obtain one contour image with the same size as the ROI and one mask image with the same size as the ROI. Alternatively, the second perceptual feature is upsampled to obtain one contour image with the same size as the microscopic image and one mask image with the same size as the microscopic image. This is not specifically limited in this embodiment of this application.

In some embodiments, the occludee layer network further includes one second deconvolution layer. The terminal inputs the second perceptual feature into the second deconvolution layer, to perform a deconvolution operation on the second perceptual feature at the second deconvolution layer to obtain the contour image and the mask image of the occludee. Herein, only an example in which the deconvolution operation is performed for the upsampling is used for description, and the upsampling may alternatively be implemented in another manner. This is not specifically limited in this embodiment of this application.

Still using FIG. 9 as an example, the occludee layer network 920 further includes a second deconvolution layer 925. After the second perceptual feature outputted by the fourth convolution layer 924 is inputted into the second deconvolution layer 925, one contour image 926 of the occludee and one mask image 927 of the occludee are outputted.

Steps 602 and 603 provides a possible implementation in which the terminal performs instance segmentation on the ROI to determine the respective contour image and mask image of the at least one target object included in the microscopic image. In other words, the instance segmentation is performed on the ROI through the pre-trained bilayer instance segmentation model, to distinguish different target object instances in the microscopic image. An example in which the target object is the nematode is used. In this embodiment of this application, descriptions are provided only by using the example in which the ROI includes a plurality of overlapping target objects. However, in an observation process, the ROI may include only a single target object. In this case, instance segmentation may be performed in the instance segmentation manner in steps 602 and 603 or by using some conventional image segmentation algorithms. This is not specifically limited in this embodiment of this application.

In some embodiments, the bilayer instance segmentation model is obtained through training based on a plurality of synthetic sample images. The synthetic sample image includes a plurality of target objects. The synthetic sample image is synthesized based on a plurality of original images including only a single target object. In other words, to improve segmentation accuracy of the bilayer instance segmentation model, the training is performed at a training stage by using the synthetic sample images including the plurality of target objects. This can greatly improve segmentation accuracy of the bilayer instance segmentation model for targets such as the target object. Moreover, the model obtained through training in the foregoing manner can solve, without a manual operation by a technician, various complex cases such as that a plurality of instances overlap each other or that a single instance self-overlaps due to twisting.

In some embodiments, it is time-consuming and labor-intensive to manually acquire sample images including a plurality of target objects, and a technician needs to manually add some label information. Therefore, one synthetic sample image including a plurality of target objects may be directly synthesized by using a plurality of original images including only a single target object. In addition, synthetic sample images with any overlapping form and including any quantity of instances may be synthesized in different permutation and combination manners, so that a synthetic sample image with better training quality and better training effects can be synthesized through data enhancement in a training set including the original images. The foregoing processing manner can help to obtain a bilayer instance segmentation model with better instance segmentation effects and higher accuracy through training.

In some embodiments, when one synthetic sample image is synthesized by using a plurality of original images, the following synthesis manner may be adopted: When the target object is darker than background in the original image, a lowest pixel value among pixels in the same position in the plurality of original images is assigned to a pixel in the same position in the synthetic sample image. In other words, a pixel value of each pixel in the synthetic sample image is equal to a lowest pixel value among pixels in the same position in the plurality of original images used for synthesizing the synthetic sample image; For example, when the nematode is darker than the background (closer to black), assuming that the original images include an image 1 and an image 2, one synthetic sample image is synthesized by selecting min(image 1, image 2) pixel by pixel.

Figure 10:
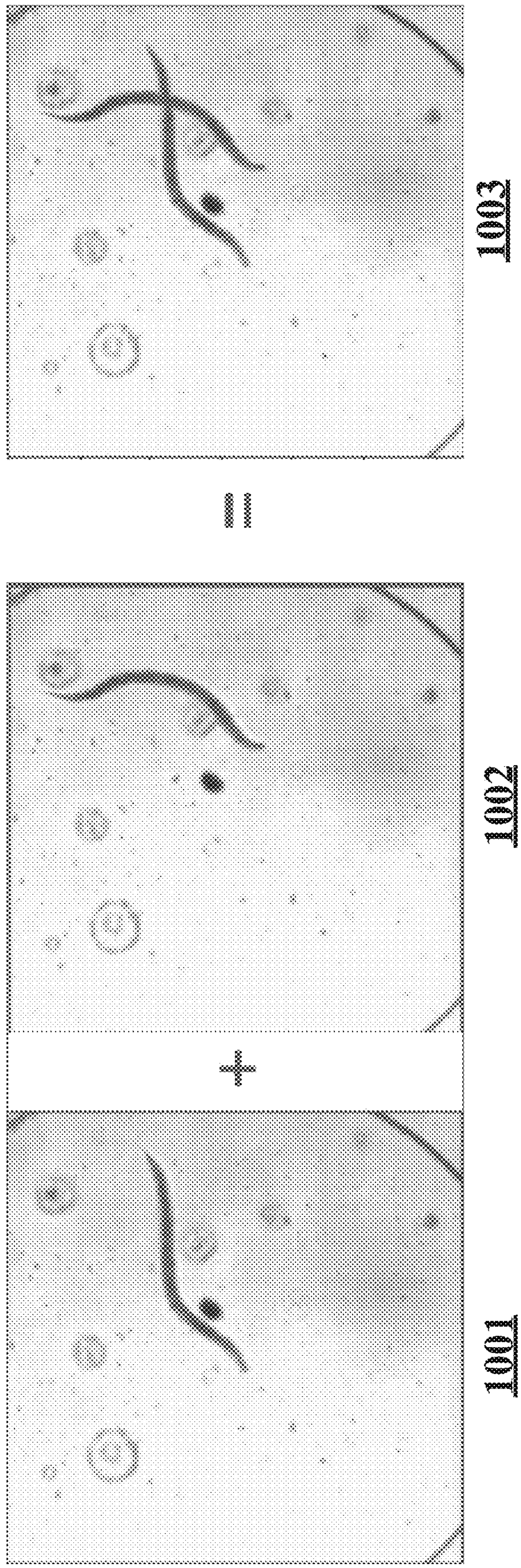
FIG. 10 is a flowchart of synthesis of a synthetic sample image according to an embodiment of this application.

FIG. 10 is a flowchart of synthesis of the synthetic sample image according to this embodiment of this application. As shown in FIG. 10, descriptions are provided by using an example in which the target object is the nematode. Assuming that there are two original images 1001 and 1002, one synthetic sample image 1003 can be synthesized by selecting min(original image 1001, original image 1002) pixel by pixel, and it is ensured that a pixel value of each pixel in the synthetic sample image 1003 is equal to a lowest pixel value among pixels in the same position in the original images 1001 and 1002. For example, if a pixel value of a pixel with coordinates (10, 21) in the original image 1001 is 245, and a pixel value of a pixel with the coordinates (10, 21) in the original image 1002 is 200, min(245, 200)=200 is assigned to a pixel value of a pixel with the coordinates (10, 21) in the synthetic sample image 1003. In other words, a minimum value (namely, a lowest pixel value) among the pixel values of the pixels with the coordinates (10, 21) in the original image 1001 and the original image 1002 is assigned to the pixel value of the pixel with the coordinates (10, 21) in the synthetic sample image 1003.

In some other embodiments, when one synthetic sample image is synthesized by using a plurality of original images, the following synthesis manner may alternatively be adopted: When the target object is brighter than background in the original image, a highest pixel value among pixels in the same position in the plurality of original images is assigned to a pixel in the same position in the synthetic sample image. In other words, a pixel value of each pixel in the synthetic sample image is equal to a highest pixel value among pixels in the same position in the plurality of original images. For example, when the nematode is brighter than the background (closer to white), assuming that the original images include an image 1 and an image 2, one synthetic sample image is synthesized by selecting max(image 1, image 2) pixel by pixel.

In the foregoing manner of obtaining the synthetic sample image, a large quantity of training data, namely, synthetic sample images, including a plurality of overlapping target objects can be synthesized by using a limited quantity of original images including only a single target object. When the bilayer instance segmentation model is trained in an enhanced training set including the synthetic sample images in the foregoing processing manner, it is beneficial to obtaining the bilayer instance segmentation model with better instance segmentation effects and higher accuracy through training.

Steps 601 to 603 provide a possible implementation in which the instance segmentation is performed on the microscopic image to obtain the instance image including the target object in the microscopic image. The instance image includes the contour image and the mask image of the target object. In other words, descriptions are provided by using an example in which the ROI is first extracted from the microscopic image and then the instance segmentation is performed on the ROI, so that the instance segmentation algorithm does not need to be run on the entire microscopic image. This can save computing resources of the terminal. In some other embodiments, the terminal may alternatively perform instance segmentation on the entire microscopic image. This can avoid missing some small target objects during the extraction of the ROI.

604: For any target object in the ROI, the terminal inputs the mask image of the target object into a skeleton extraction model, to perform skeleton extraction on the target object through the skeleton extraction model to output a skeleton form image of the target object.

In step 604, because the instance image of the target object includes the contour image and the mask image, the terminal inputs the mask image in the instance image of each target object into the skeleton extraction model, to perform skeleton extraction on the target object through the skeleton extraction model to output the skeleton form image of the target object. The skeleton extraction model is used for predicting a skeleton form of the target object based on the mask image in the instance image of the target object.

In some embodiments, for each target object included in the ROI, a skeleton form image of the target object may be extracted through step 604. In some embodiments, the skeleton extraction model is a CNN model including a plurality of convolution layers. The terminal inputs the mask image of the target object into the plurality of convolution layers of the skeleton extraction model, to perform convolution operations on the mask image of the target object through the plurality of convolution layers to output the skeleton form image. For example, the terminal inputs the mask image of the occluder or the occludee into the skeleton extraction model, to perform convolution operations on the mask image through the plurality of convolution layers connected in series in the skeleton extraction model. The last convolution layer outputs a skeleton form image, where a skeleton of the target object in the skeleton form image has a single-layer pixel width.

In some embodiments, the skeleton form image is a binary image. In the skeleton form image, a skeleton pixel and a non-skeleton pixel have different values. For example, in the skeleton form image, a pixel with a value of 1 is the skeleton pixel, and a pixel with a value of 0 is the non-skeleton pixel. Alternatively, a pixel with a value of 0 is the skeleton pixel, and a pixel with a value of 1 is the non-skeleton pixel. This is not specifically limited in this embodiment of this application. In this case, the skeleton pixels in the skeleton form image can form the skeleton that is of the target object and that has the single-layer pixel width. A form of the skeleton represents the skeleton form of the target object in the microscopic image.

In this embodiment of this application, on the basis of the instance segmentation result, namely, the instance image, the skeleton extraction algorithm is applied to each instance that is of the target object and that is obtained through segmentation, to extract the skeleton form image. The foregoing processing manner helps kinematics analysis on the skeleton form image of the target object, to improve analysis efficiency of the kinematics analysis without manual participation or naked-eye counting.

In some embodiments, the skeleton extraction model is obtained through training based on a sample image including the target object and skeleton form label information labeled on the target object. In some embodiments, the skeleton form label information includes respective skeleton tangential angles of a plurality of sampling points for sampling the skeleton form of the target object in the sample image. The skeleton tangential angle represents an angle between a tangent line corresponding to the sampling point as a tangent point and a horizontal line on the directed skeleton form from a head endpoint to a tail endpoint. In other words, for any sample image including the target object, a technician may label a skeleton form of the target image and a head endpoint and a tail endpoint on the skeleton form, so that the directed skeleton form from the head endpoint to the tail endpoint can be formed. Then, the labeled directed skeleton form is sampled. A plurality of sampling points on the directed skeleton form are first determined. Then, for each sampling point, a tangent line with the sampling point as a tangent point is generated on the directed skeleton form, and an included angle between the tangent line and the horizontal line is determined as a skeleton tangential angle of the sampling point. The foregoing operation is repeated to obtain respective skeleton tangential angles of the plurality of sampling points. The respective skeleton tangential angles of the plurality of sampling points are determined as the skeleton form label information of the sample image. The foregoing operation is performed on each sample image, so that skeleton form label information of each sample image can be obtained.

In the foregoing process, the skeleton tangential angles of the plurality of sampling points are used as the skeleton form label information of each sample image, to help quantify accuracy of prediction of the skeleton form and compare an error between the skeleton form predicted through the skeleton extraction model and an actual skeleton form in the sample image, thereby helping obtain, through training, a skeleton extraction model more applicable to the target object.

In some embodiments, a loss function value of the skeleton extraction model at a training stage is determined based on errors between the respective skeleton tangential angles and predicted tangential angles of the sampling points. The predicted tangential angle is obtained by sampling the skeleton form image obtained by predicting the sample image through the skeleton extraction model.

At the training stage, in any iteration, a current sample image is inputted into the skeleton extraction model, to perform convolution operations on the sample image through the plurality of convolution layers connected in series in the skeleton extraction model. The last convolution layer outputs a predicted skeleton image of the sample image. Next, a plurality of sampling points are also determined in the predicted skeleton image in the same sampling manner as the sample image, and a predicted tangential angle of each sampling point is obtained. A manner of obtaining the predicted tangential angle is similar to the manner of obtaining the skeleton tangential angle. Details are not described herein again. Then, a prediction error of the current sample image can be obtained based on errors between the respective skeleton tangential angles and predicted tangential angles of the plurality of sampling points. The prediction error may be a sum, an arithmetic average, or a weighted average of the errors between the skeleton tangential angles and the predicted tangential angles of the sampling points. This is not specifically limited herein. In this iteration, the foregoing operation is performed on each sample image, so that respective prediction errors of all the sample images can be obtained. A loss function value of the skeleton extraction model in this iteration can be determined based on the respective prediction errors of all the sample images. Then, it is determined whether a quantity of iterations or the loss function value meets a training stopping condition. For example, when the quantity of iterations is greater than a quantity threshold or the loss function value is less than a loss threshold, it is considered that the training stopping condition is met, and training (in other words, parameter adjustment) of the skeleton extraction model is stopped to obtain the trained skeleton extraction model. Otherwise, when the quantity of iterations is less than or equal to a quantity threshold and the loss function value is greater than or equal to a loss threshold, it is considered that the training stopping condition is not met, and iterative parameter adjustment continues to be performed on the skeleton extraction model. The quantity threshold is any integer greater than or equal to 1, and the loss threshold is any numerical value greater than 0.

Figure 11:
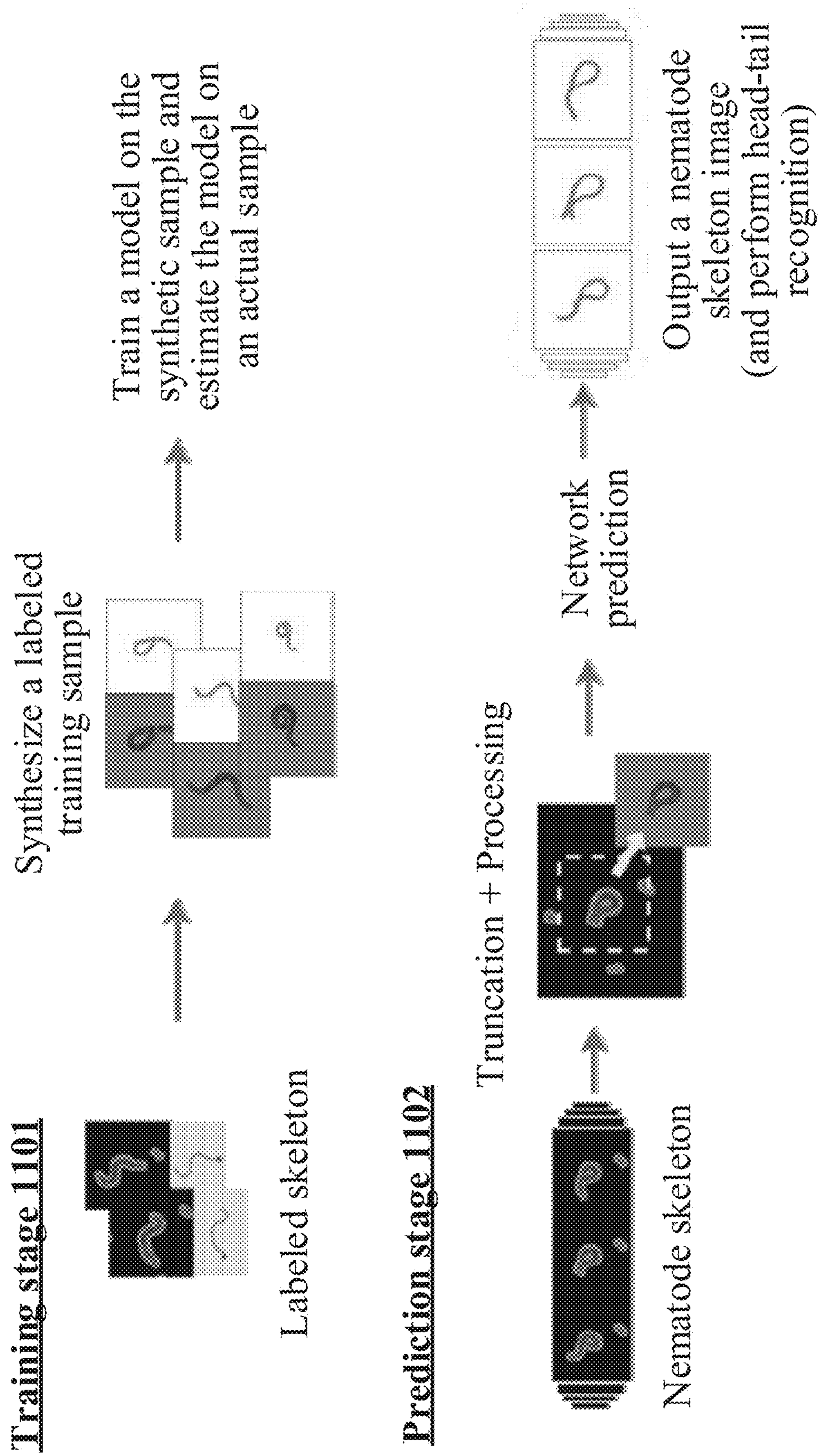
FIG. 11 is a schematic principle diagram of training and prediction stages of a skeleton extraction model according to an embodiment of this application.

FIG. 11 is a schematic principle diagram of training and prediction stages of the skeleton extraction model according to this embodiment of this application. As shown in FIG. 11, a technician first labels a skeleton form for a sample image at a training stage 1101. Then, skeleton form label information (namely, skeleton tangential angles of a plurality of sampling points) is generated based on the labeled skeleton form. Next, data enhancement manners such as deformation, flipping, and size transformation may be performed based on label data to synthesize more and richer training data sets. Finally, the skeleton extraction model is trained in the training data set, and skeleton extraction performance of the trained skeleton extraction model is evaluated on a real sample image. At a prediction stage 1102, instance segmentation is performed on a microscopic image including a plurality of target objects, to locate a single instance, namely, a single target object, from the microscopic image, and generate a mask image of the single target object. Then, the mask image is inputted into the trained skeleton extraction model, to perform skeleton extraction on the target object through the skeleton extraction model to obtain a skeleton form image of the target object.

In the foregoing process, the plurality of sampling points are determined based on the labeled target object, and the skeleton tangential angles of the sampling points are obtained as the skeleton form label information, so that the skeleton form predicted by the skeleton extraction model and the actually labeled skeleton form of the sample image can be accurately quantified, to help compare an error between a predicted skeleton and a labeled skeleton, thereby obtaining, through training, the skeleton extraction model with an accurate skeleton extraction function for the target object. In addition, good skeleton extraction effects still achieved in complex cases of the instance segmentation result such as self-twisting.

605: The terminal recognizes the head endpoint and the tail endpoint in the skeleton form of the target object based on the skeleton form image.

In some embodiments, the terminal may directly recognize the head endpoint and the tail endpoint from the skeleton form image. To be specific, an endpoint recognition model is trained. An input of the endpoint recognition model is the skeleton form image, and an output is respective endpoint coordinates of the head endpoint and the tail endpoint.

Figure 12:
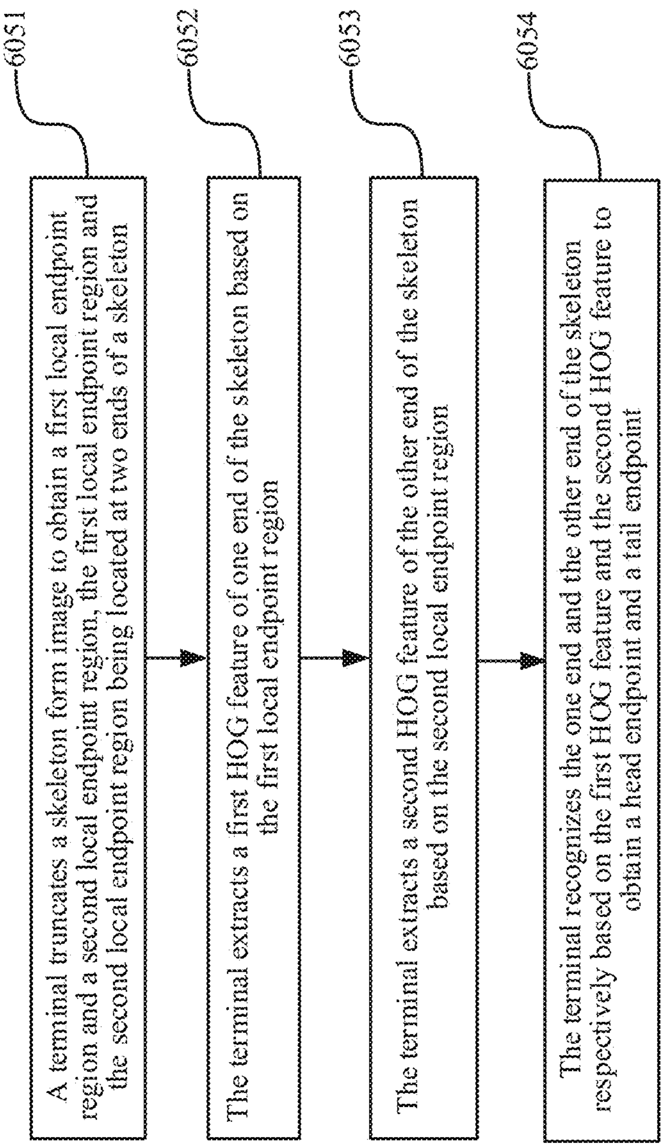
FIG. 12 is a flowchart of a method for recognizing a head endpoint and a tail endpoint according to an embodiment of this application.

In some other embodiments, the terminal may alternatively first truncate the skeleton form image to obtain local endpoint regions of one end and the other end of the skeleton, and then perform binary classification on each local endpoint region obtained through truncation. In other words, a head-tail recognition model for binary classification is trained to determine whether an inputted local endpoint region is the head endpoint or the tail endpoint. The foregoing processing manner can reduce a calculation amount in a head-tail recognition process and improve recognition efficiency in the head-tail recognition process. Using this case as an example for description, FIG. 12 is a flowchart of a method for recognizing the head endpoint and the tail endpoint according to this embodiment of this application. As shown in FIG. 12, step 605 may be implemented by the following steps 6051 to 6054.

6051: The terminal truncates the skeleton form image to obtain a first local endpoint region and a second local endpoint region, the first local endpoint region and the second local endpoint region being located at two ends of the skeleton.

In some embodiments, because the skeleton pixels in the skeleton form image can form the skeleton with the single-pixel width, it is easy to find the two endpoints of the skeleton. Next, each endpoint may be used as a truncation center to determine, in the skeleton form image, an endpoint candidate frame centered on the endpoint. Then, a local endpoint region delineated by the endpoint candidate frame may be found directly from the skeleton form image. To help distinguish the respective local endpoint regions of the two endpoints herein, a truncation region at one end of the skeleton is referred to as a first local endpoint region, and a truncation region at the other end of the skeleton is referred to as a second local endpoint region.

6052: The terminal extracts a first HOG feature of the one end of the skeleton based on the first local endpoint region.

In some embodiments, after the terminal truncates the skeleton form image to obtain the first local endpoint region, an original local image with the same position as the first local endpoint region may be found from the original microscopic image. Next, the first HOG feature may be extracted for the original local image. In some embodiments, the original local image is divided into a plurality of cell units, where the cell unit is a small connected region in the image. Next, a direction histogram of a gradient or an edge of each pixel in each cell unit is acquired. Then these histograms are combined to form a feature descriptor of the cell unit. The foregoing operation is repeated until a first HOG feature of the entire original local image is obtained.

6053: The terminal extracts a second HOG feature of the other end of the skeleton based on the second local endpoint region.

Step 6053 is similar to step 6052, and details are not described herein again.

6054: The terminal recognizes the one end and the other end of the skeleton respectively based on the first HOG feature and the second HOG feature to obtain the head endpoint and the tail endpoint.

In some embodiments, the terminal may recognize/classify the head endpoint and the tail endpoint through the head-tail recognition model. The head-tail recognition model is used for determining, according to a HOG feature of a local endpoint region, whether an endpoint in a skeleton of a target object is a head endpoint or a tail endpoint. On this basis, step 6054 may be implemented by the following steps C1 to C3.

C1: The terminal inputs the first HOG feature into the head-tail recognition model, to perform binary classification on the first HOG feature through the head-tail recognition model to obtain a first recognition result of the one end of the skeleton.

The first recognition result represents whether the one end of the skeleton is the head endpoint or the tail endpoint.

In some embodiments, the head-tail recognition model includes two binary classification models: a head recognition model and a tail recognition model. The head recognition model for performing binary classification on the head endpoint is obtained through training by using HOG features of some local endpoint regions that are labeled as head endpoints in advance. In addition, the head recognition model for performing binary classification on the tail endpoint is obtained through training by using HOG features of some local endpoint regions that are labeled as tail endpoints in advance. Then, the first HOG feature is inputted into the head recognition model obtained through training. The head recognition model performs, on the one end of the skeleton, binary classification for determining whether the one end of the skeleton is the head endpoint, to output the first recognition result representing whether the one end of the skeleton is the head endpoint.

For example, descriptions are provided by using an example in which the head recognition model is an SVM binary classification model. After the first HOG feature is inputted into the SVM binary classification model, the SVM binary classification model performs binary classification on the first HOG feature, to output the first recognition result representing whether the one end of the skeleton is the head endpoint. For example, the SVM binary classification model predicts, based on the first HOG feature, a recognition probability that the one end of the skeleton is the head endpoint. When the recognition probability is greater than a classification threshold, the first recognition result is set to "Y (Yes)", to represent that the one end of the skeleton is the head endpoint. Otherwise, the first recognition result is set to "N (No)", to represent that the one end of the skeleton is not the head endpoint. The classification threshold is any numerical value greater than or equal to 0 and less than or equal to 1.

In some other embodiments, the head-tail recognition model is a whole multi-classification model for determining whether an endpoint of a skeleton is a head endpoint or a tail endpoint. In this way, the head-tail recognition model for performing multi-classification on the head endpoint/tail endpoint is obtained through training by using HOG features of some local endpoint regions that are labeled as head endpoints and tail endpoints in advance. Then, the first HOG feature is inputted into the head-tail recognition model obtained through training, to perform multi-classification on the one end of the skeleton through the head-tail recognition model to output the first recognition result representing whether the one end of the skeleton is the head endpoint/tail endpoint/neither the head endpoint nor the tail endpoint.

For example, descriptions are provided by using an example in which the head-tail recognition model is an SVM multi-classification model. After the first HOG feature is inputted into the SVM multi-classification model, the SVM multi-classification model performs multi-classification on the first HOG feature, to output the first recognition result representing whether the one end of the skeleton is the head endpoint/tail endpoint/neither the head endpoint nor the tail endpoint. In other words, three classification labels may be configured for the SVM multi-classification model: "head endpoint", "tail endpoint", and "neither the head endpoint nor the tail endpoint". The SVM multi-classification model predicts, based on the first HOG feature, a classification probability that the one end of the skeleton belongs to each classification label. Next, a classification label with a highest classification probability is determined as the first recognition result of the one end of the skeleton.

C2: The terminal inputs the second HOG feature into the head-tail recognition model, to perform binary classification on the second HOG feature through the head-tail recognition model to obtain a second recognition result of the other end of the skeleton.

The second recognition result represents whether the other end of the skeleton is the head endpoint or the tail endpoint.

In some embodiments, if the head-tail recognition model includes the two binary classification models, namely, the head recognition model and the tail recognition model, when the first recognition result obtained in step C1 indicates that the one end of the skeleton is the head endpoint, the tail recognition model may be called in step C2 to perform binary classification on the second HOG feature, to output the second recognition result representing whether the other end of the skeleton is the tail endpoint. For example, descriptions are provided by using an example in which the tail recognition model is an SVM binary classification model. After the second HOG feature is inputted into the SVM binary classification model, the SVM binary classification model performs binary classification on the second HOG feature, to output the second recognition result representing whether the other end of the skeleton is the tail endpoint. For example, the SVM binary classification model predicts, based on the second HOG feature, a recognition probability that the other end of the skeleton is the tail endpoint. When the recognition probability is greater than the classification threshold, the second recognition result is set to "Y (Yes)", to represent that the other end of the skeleton is the tail endpoint. Otherwise, the second recognition result is set to "N (No)", to represent that the other end of the skeleton is not the tail endpoint.

In some embodiments, when the head-tail recognition model includes the two binary classification models, namely, the head recognition model and the tail recognition model, when the first recognition result obtained in step C1 indicates that the one end of the skeleton is not the head endpoint, the head recognition model may continue to be called to perform binary classification on the second HOG feature, to output the second recognition result representing whether the other end of the skeleton is the head endpoint. In addition, the tail recognition model is called to perform binary classification on the first HOG feature to determine whether the one end of the skeleton is the tail endpoint.

In some other embodiments, if the head-tail recognition model is a multi-classification model, the second HOG feature may also be inputted into the head-tail recognition model obtained through training, to perform multi-classification on the other end of the skeleton through the head-tail recognition model to output the second recognition result representing that the other end of the skeleton is the head endpoint/tail endpoint/neither the head endpoint nor the tail endpoint.

For example, descriptions are provided by using an example in which the head-tail recognition model is the SVM multi-classification model. After the second HOG feature is inputted into the SVM multi-classification model, the SVM multi-classification model performs multi-classification on the second HOG feature, to output the second recognition result representing whether the other end of the skeleton is the head endpoint/tail endpoint/neither the head endpoint nor the tail endpoint. In other words, three classification labels may be configured for the SVM multi-classification model: "head endpoint", "tail endpoint", and "neither the head endpoint nor the tail endpoint". The SVM multi-classification model predicts, based on the second HOG feature, a classification probability that the other end of the skeleton belongs to each classification label. Next, a classification label with a highest classification probability is determined as the second recognition result of the other end of the skeleton.

C3: The terminal determines the head endpoint and the tail endpoint based on the first recognition result and the second recognition result.

In some embodiments, if the first recognition result and the second recognition result indicate that the one end of the skeleton is the head endpoint and the other end of the skeleton is the tail endpoint, or that the one end of the skeleton is the tail endpoint and the other end of the skeleton is the head endpoint, in other words, one endpoint is the head endpoint and the other endpoint is the tail endpoint, it indicates that the recognition results are normal, and a subsequent procedure is continued.

In some embodiments, if the first recognition result and the second recognition result indicate that the two endpoints are both head endpoints, the two endpoints are both tail endpoints, or each of the two endpoints is "neither the head endpoint nor the tail endpoint", automatic correction may be performed only to some extent. For example, if the head recognition model classifies both of the two endpoints as head endpoints, an endpoint with a higher recognition probability is selected as the head endpoint, and the remaining endpoint is used as the tail endpoint. In this case, the tail recognition model is used for verification. If a probability that the remaining endpoint is recognized as the tail endpoint is greater than a probability that the selected head endpoint is recognized as the tail endpoint, the verification succeeds. Alternatively, if the tail recognition model classifies both of the two endpoints as tail endpoints, this verification manner may also be used for analogy. Alternatively, the recognition result may be directly reported to a technician for manual investigation. This is not specifically limited in this embodiment of this application.

Figure 13:
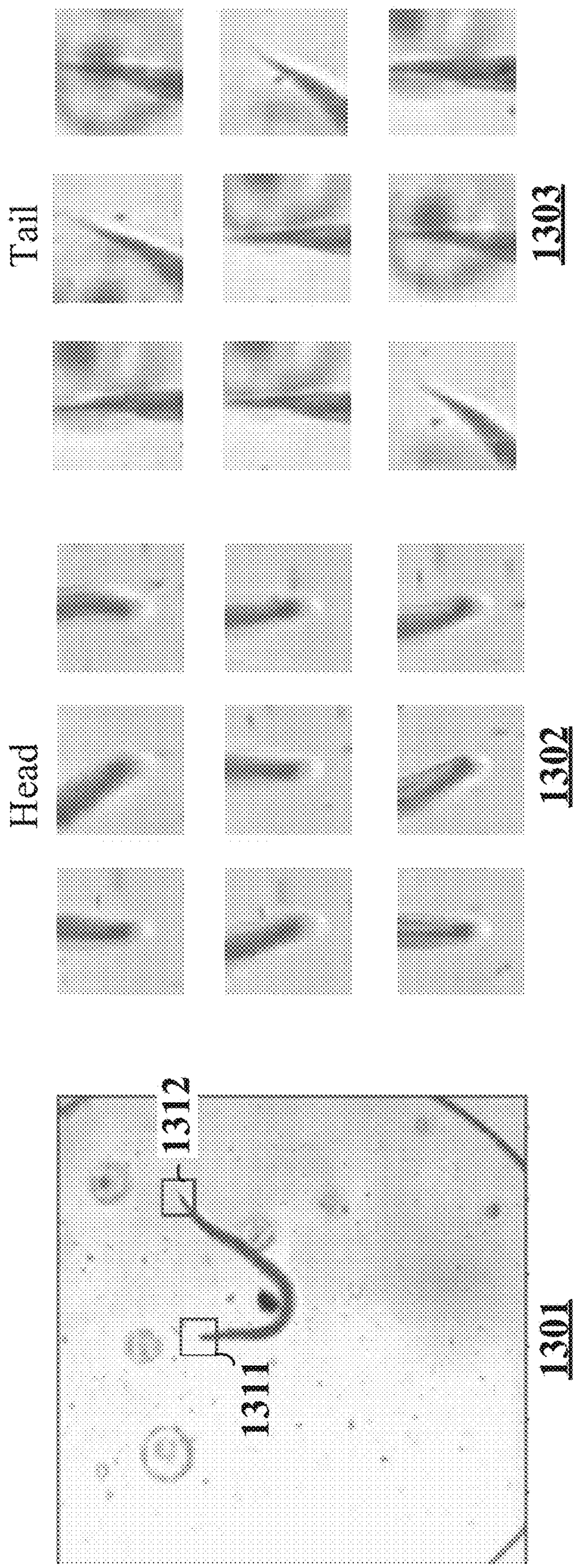
FIG. 13 is a schematic diagram of obtaining a local endpoint region through truncation according to an embodiment of this application.

FIG. 13 is a schematic diagram of obtaining a local endpoint region through truncation according to this embodiment of this application. As shown in FIG. 13, descriptions are provided by using an example in which the target object is the nematode. Two corresponding original local images 1311 and 1312 may be obtained through sampling in a microscopic image 1301 according to a first local endpoint region and a second local endpoint region. Then, it may be separately determined, through the head-tail recognition model, whether respective skeleton endpoints included in the original local images 1311 and 1312 are a head endpoint or a tail endpoint. For the nematode, the head and tail of the nematode greatly differ in morphology. As shown in 1302, several examples of a local image of the head of the nematode are provided. It can be learned that an edge of the head of the nematode is round. As shown in 1303, several examples of a local image of the tail of the nematode are provided. It can be learned that an edge of the tail of the nematode is sharp. HOG features are respectively extracted for the two original local images, where the HOG feature can well describe statistical gradient features in different directions, so that the round edge and the sharp edge can be clearly distinguished. In this way, accuracy of recognizing the head and tail of the nematode is high after the HOG feature and the SVM classifier are combined.

In the foregoing process, on the basis of the extracted skeleton form image, one local image region is obtained through truncation for each of the two endpoints of the skeleton. The skeleton endpoint in the local image region is classified into the head endpoint or the tail endpoint. In an example, a 128-dimensional HOG feature is extracted for each skeleton endpoint. In this case, accuracy of recognizing the head and tail of the nematode reaches up to 98%, so that a head/tail recognition speed and the recognition accuracy can be well balanced.

606: The terminal determines the skeleton form image, the head endpoint, and the tail endpoint as skeleton form information of the target object.

The skeleton form information represents a form of the skeleton of the target object.

In some embodiments, a current skeleton form of the target object can be determined by using the skeleton form image, and a direction of the skeleton form can be determined by using the recognized head endpoint and tail endpoint. In other words, a complete directed skeleton form (from the head endpoint to the tail endpoint) can be formed, where the directed skeleton form is the skeleton form information of the target object.

Steps 604 to 606 provide a possible implementation of performing skeleton extraction on the target object in the instance image to obtain the skeleton form information of the target object. To be specific, the skeleton form image is first extracted through the skeleton extraction model, and then the head endpoint and the tail endpoint are recognized through the head-tail recognition model, so that the directed skeleton form from the head endpoint to the tail endpoint can be obtained, and richer and deeper kinematics analysis can be performed on the target object on the basis of the directed skeleton form. In some other embodiments, only an undirected skeleton form in the skeleton form image may be used as the skeleton form information. This is not specifically limited in this embodiment of this application.

607: The terminal samples the skeleton form of the target object based on the skeleton form information, to obtain an eigenvector including respective skeleton tangential angles of a plurality of sampling points.

The skeleton tangential angle represents an angle between a tangent line corresponding to the sampling point as a tangent point and the horizontal line on the directed skeleton form from the head endpoint to the tail endpoint.

In some embodiments, the terminal selects the plurality of sampling points on the directed skeleton form from the head endpoint to the tail endpoint. Then, for each sampling point, a tangent line with the sampling point as a tangent point is generated on the directed skeleton form (because the skeleton form is directed, the tangent line is a ray along a direction of the skeleton form instead of an undirected straight line). Next, an angle between the tangent line and the horizontal line is determined as a skeleton tangential angle of the sampling point. The foregoing operation is repeated to obtain the respective skeleton tangential angles of the plurality of sampling points. The respective skeleton tangential angles of the plurality of sampling points can form the eigenvector, where a dimension of the eigenvector is equal to a quantity of sampling points, and each element in the eigenvector is a skeleton tangential angle of one sampling point.

608: The terminal performs, based on a plurality of preset motion states, motion component decomposition on the directed skeleton form represented by the eigenvector, to obtain motion component information of the target object.

The motion component information refers to respective eigenvalues that are of the plurality of preset motion states and that are obtained through motion decomposition of the skeleton form information.

In some embodiments, after a technician defines the plurality of preset motion states in advance, each preset motion state actually represents one preset skeleton form. A preset eigenvector corresponding to a preset skeleton form can also be obtained by sampling the preset skeleton form in a manner similar to that in step 607, and then the eigenvector obtained in step 607 is decomposed into a weighted sum of a plurality of preset eigenvectors. In the foregoing processing manner, the motion component information of the target object can be obtained according to a weight coefficient (namely, the eigenvalue) occupied by each preset eigenvector during the decomposition, so that any skeleton form can be decomposed into a combination of the plurality of preset motion states, thereby greatly facilitating the kinematic analysis of the target object.

Figure 14:
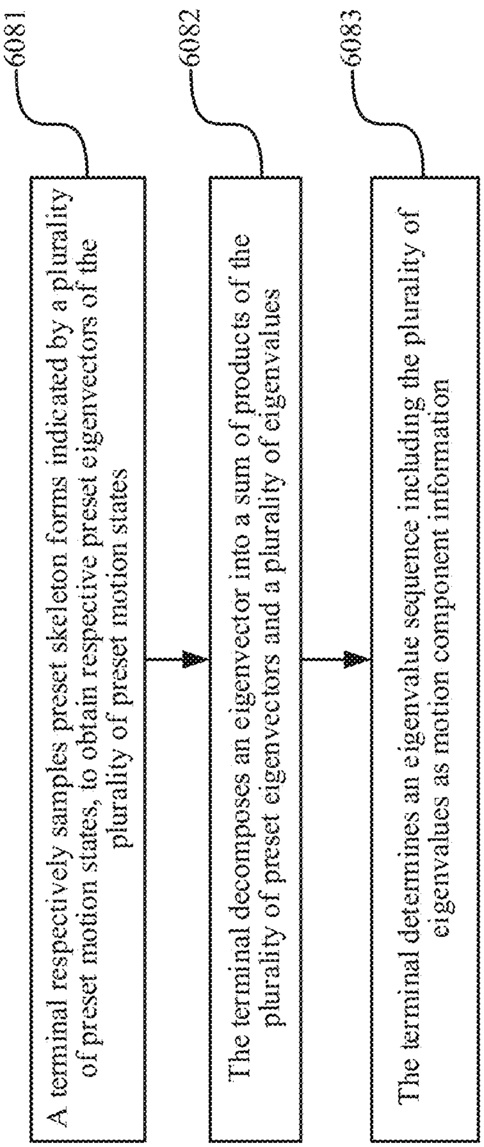
FIG. 14 is a flowchart of motion analysis of a target object according to an embodiment of this application.

In some embodiments, the motion component information includes the plurality of eigenvalues of the plurality of preset motion states, and the eigenvalue represents the weight coefficient that corresponds to the preset motion state during the motion component decomposition. In this case, FIG. 14 is a flowchart of motion analysis of the target object according to this embodiment of this application. As shown in FIG. 14, step 608 may be implemented by the following steps 6081 to 6083.

6081: The terminal separately samples preset skeleton forms indicated by the plurality of preset motion states, to obtain the respective preset eigenvectors of the plurality of preset motion states.

In some embodiments, for each preset motion state, a plurality of sampling points are selected from a directed preset skeleton form indicated by the preset motion state. A selection manner for the sampling points on the preset skeleton form needs to be consistent with the selection manner for the sampling points in step 607. Then, for each sampling point, a tangent line with the sampling point as a tangent point is generated on the preset skeleton form (because the preset skeleton form is also directed, the tangent line is a ray along a direction of the preset skeleton form instead of an undirected straight line). Next, an angle between the tangent line and the horizontal line is determined as a skeleton tangential angle of the sampling point. The foregoing operation is repeated to obtain the respective skeleton tangential angles of the plurality of sampling points. The skeleton tangential angles of the plurality of sampling points can form a preset eigenvector, where a dimension of the preset eigenvector is equal to a quantity of sampling points, and each element in the preset eigenvector is a skeleton tangential angle of one sampling point. Because the sampling manners in step 607 and step 6081 are consistent, and this means that quantities of sampling points are consistent, the eigenvector and the preset eigenvector have the same dimension.

6082: The terminal decomposes the eigenvector into a sum of products of the plurality of preset eigenvectors and the plurality of eigenvalues.

In some embodiments, the eigenvector is decomposed into the sum of the products of the plurality of preset eigenvectors and the plurality of eigenvalues. In other words, assuming that the eigenvector is a K-dimensional vector, where this is equivalent to describing the skeleton form of the target object by using skeleton tangential angles of K sampling points, it is obvious that the preset eigenvector is also a K-dimensional vector. Assuming that K preset motion states are specified in total, N preset eigenvectors can be obtained (each preset eigenvector is a K-dimensional vector). That is, the preset eigenvectors of all the preset motion states form an N×K matrix. A covariance is extracted from the N×K matrix, to obtain a K×K matrix. Then, decomposition into eigenvalues and K-dimensional eigenvectors is performed based on the K×K covariance matrix, to obtain N eigenvalues respectively corresponding to the N preset eigenvectors. The N eigenvalues meet the following condition: The N preset eigenvectors are respectively multiplied with the corresponding N eigenvalues to obtain N products, and the N products are added to exactly equal the K-dimensional eigenvector.

6083: The terminal determines an eigenvalue sequence including the plurality of eigenvalues as the motion component information.

The plurality of eigenvalues are obtained through decomposition in step 6083. For example, the N eigenvalues are obtained. In this case, one eigenvalue sequence can be determined. For example, assuming that there are five preset motion states, five eigenvalues are obtained by solving: a1, a2, a3, a4, and a5. In this case, an eigenvalue sequence {a1, a2, a3, a4, a5} may be used as the motion component information of the target object.

In some other embodiments, the plurality of eigenvalues in the eigenvalue sequence may alternatively be sorted in descending order, and a preset motion state corresponding to an eigenvalue in a top target position in an order is determined as a motion principal component. Then, only the eigenvalue of the motion principal component may be used as the motion component information of the target object, in other words, only a principal component that plays a decisive role in the current skeleton form of the target object is concerned, and some minor components with small proportions are ignored. For example, the N eigenvalues in the eigenvalue sequence are sorted in descending order, only five preset motion states corresponding to the top five eigenvalues are selected as motion principal components, and an eigenvalue subsequence including the top five eigenvalues is used as the motion component information of the target object. In some embodiments, top three or top 10 eigenvalues may alternatively be selected as motion principal components. This is not specifically limited in this embodiment of this application.

On the basis of obtaining the motion principal component, motion of the target object in an observation period may be further analyzed based on the motion principal component, to obtain a kinematic feature of the target object in the observation period. For example, 10 eigenvalues are obtained for a skeleton form of a specific nematode in the foregoing analysis manner, and five preset motion states corresponding to the top five (the first five) eigenvalues {a1, a2, a3, a4, a5} in descending order are selected as motion principal components, where the five motion principal components can well describe a motion state of the nematode.

Figure 15:
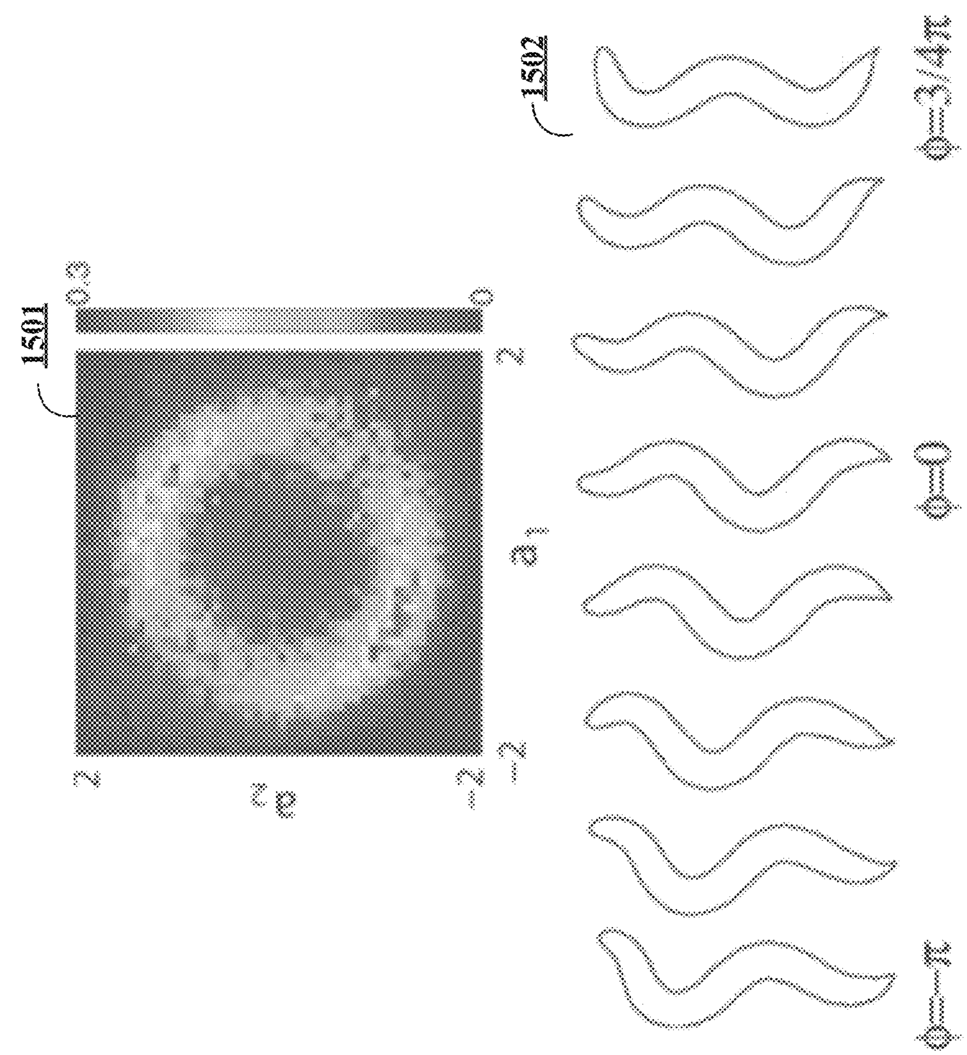
FIG. 15 is a principle diagram of motion analysis of a target object according to an embodiment of this application.

FIG. 15 is a principle diagram of motion analysis of the target object according to this embodiment of this application. As shown in FIG. 15, descriptions are provided by using an example in which the target object is a nematode. In a principal-component analysis process, although nematodes have different and unpredictable forms, the forms usually obey inherent rules. A motion principal component of the nematode can be obtained through decomposition in the motion analysis manner in steps 6081 to 6083. descriptions are provided by using an example in which a total of five preset motion states are analyzed and the top two preset motion states with the largest eigenvalues are selected as motion principal components. In this case, an original eigenvalue sequence is {a1, a2, a3, a4, a5}, and an eigenvalue subsequence of the motion principal components is {a1, a2}, in other words, the two preset motion states respectively corresponding to the eigenvalues a1 and a2 are the motion principal components. In this way, a plurality of continuous microscopic image frames including the same nematode are acquired for the nematode in an observation period, and the foregoing motion analysis procedure is performed for each microscopic image frame, so that a motion analysis probability image 1501 including the eigenvalues a1 and a2 of the same nematode in the observation period can be drawn. In the motion analysis probability image 1501, a horizontal coordinate is a value of the eigenvalue a1, a vertical coordinate is a value of the eigenvalue a2, and the shade of each coordinate point in the image represents a probability that the nematode is in a skeleton form synthesized by the eigenvalues a1 and a2 determined by using the coordinate point. Further, on the basis of the motion analysis probability image 1501, an angular phase value formed by the coordinate values of the eigenvalues a1 and a2 may also be analyzed. The angular phase value is obtained by transforming the coordinate values formed by the eigenvalues a1 and a2 into a trigonometric function and then performing inverse trigonometric function transformation. This can describe a kinematic feature of the nematode swinging forward. As shown in a motion phase analysis image 1502, it is assumed that microscopic image frames of the same nematode at eight moments are acquired, and skeleton forms of the nematode at the eight moments are sequentially arranged from left to right. It can be learned through analysis that at a moment t=1, an angle phase value $\phi=-\pi$; at a moment t=5, an angle phase value $\phi=0$; and at a moment t=8, an angle phase value $$\phi = \frac{3}{4}\pi.$$

Steps 607 and 608 provides a possible implementation in which the terminal performs motion analysis on the target object based on the skeleton form information to obtain the motion component information of the target object. In other words, the directed skeleton form is sampled to construct the eigenvector by using the skeleton tangential angles of the sampling points. In the foregoing processing manner, quantitative decomposition can be performed on the eigenvector, so that the extracted skeleton form can be automatically decomposed into the motion principal component, and then various kinematic parameters of the target object can be analyzed conveniently by using the motion principal component. This greatly improves efficiency of analyzing the target object.

Figure 16:
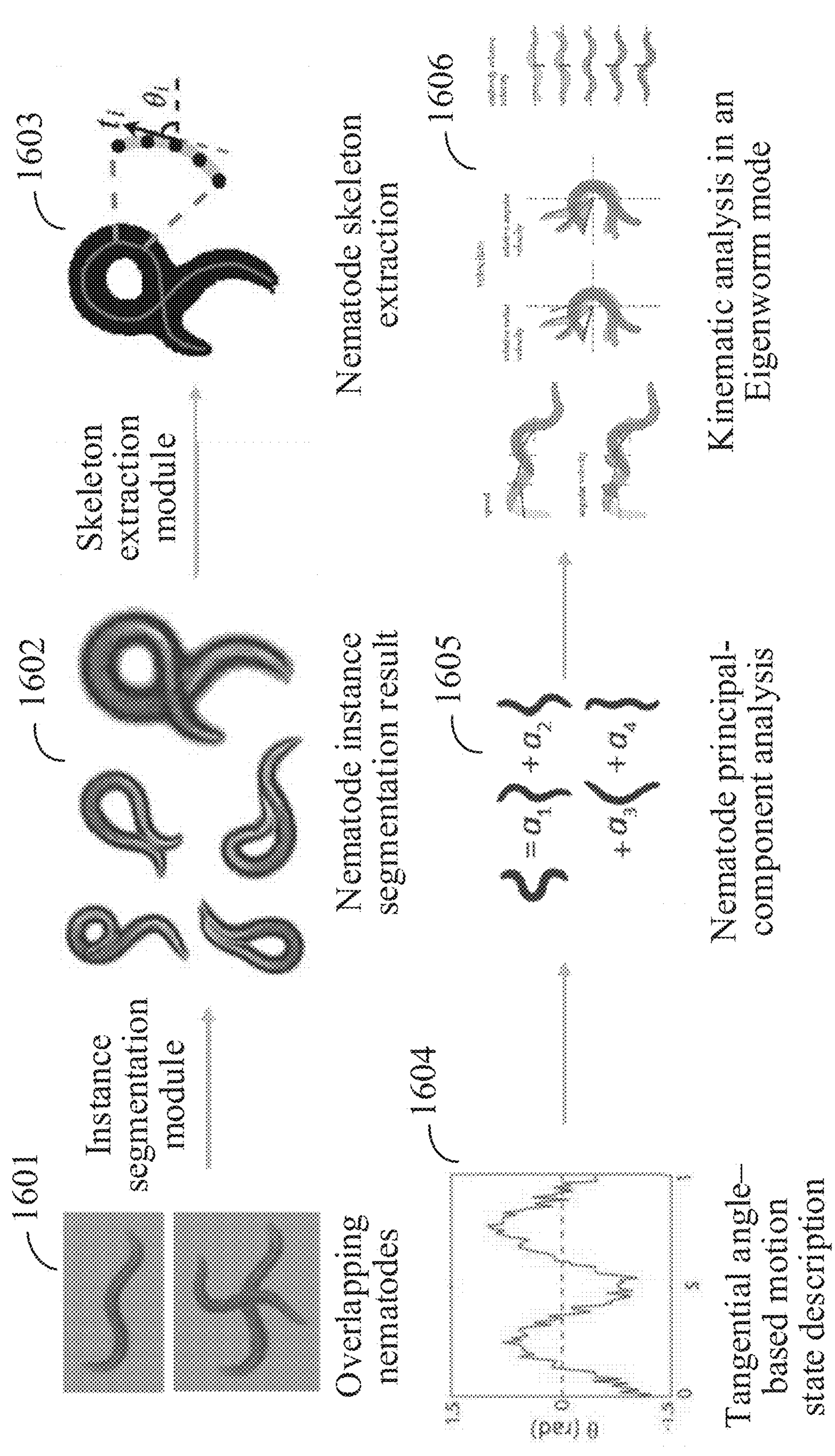
FIG. 16 is a principle flowchart of a microscopic image processing method according to an embodiment of this application.

FIG. 16 is a principle flowchart of a microscopic image processing method according to an embodiment of this application. As shown in FIG. 16, using an example in which the target object is a nematode, the processing method can be applied to various fields of nematode analysis, such as counting, segmentation, morphological measurement, and kinematics analysis, and has a very wide range of application scenarios. An original nematode image 1601 acquired by a CCD image sensor of a microscope includes two cases: a case of a single nematode and a case of a plurality of nematodes. The single nematode may twist, and the plurality of nematodes may overlap each other. Therefore, a nematode image 1601 is inputted into an instance segmentation model (namely, the bilayer instance segmentation model) that can process overlapping targets, to obtain a result 1602 through nematode instance segmentation. Next, each single-nematode target instance obtained through instance segmentation is inputted into the skeleton extraction model for skeleton extraction, to obtain a skeleton extraction result 1603. In addition, it is necessary to recognize a head endpoint and a tail endpoint of a single nematode. Then, after the skeleton extraction and the head-tail recognition, a skeleton tangential angle is used for describing a motion state of the nematode. As shown in the skeleton extraction result 1603, five sampling points are set on an enlarged skeleton arc, where an angle $\theta_i$ between a tangent line $t_i$ of the third sampling point and a horizontal line is a skeleton tangential angle of the of the point. Then, an eigenvector including skeleton tangential angles of a plurality of sampling points is decomposed into motion principal components through the motion principal component analysis. Eigenvalues of the motion principal components obtained through decomposition are inputted into subsequent kinematic parameter analysis, so that a motion speed, an angular speed, an axial speed, and the like of the nematode can be automatically outputted. As shown in a state description image 1604, it is assumed that a relationship diagram between a normalized serial number of a sampling point and a skeleton tangential angle is drawn after serial numbers of the plurality of sampling points are normalized. A horizontal coordinate represents a normalized sampling point sequence, and a vertical coordinate represents a value of a skeleton tangential angle of a sampling point corresponding to the serial number. As shown in a principal-component analysis module 1605, a skeleton form of a specific nematode may be decomposed into a weighted sum of four preset motion forms, and respective weights of the four preset motion forms, namely, eigenvalues, are {a1, a2, a3, a4} respectively. Finally, as shown in 1606, deeper kinematic analysis such as analysis of a motion speed, an angular speed, an axial speed, and the like of the nematode may be performed in an Eigenworm mode.

The foregoing optional technical solutions can be arbitrarily combined to form an optional embodiment of the present disclosure. Details are not described herein one by one.

According to the method provided in this embodiment of this application, the instance segmentation is performed on the target object included in the microscopic image, to determine the instance image of each target object, namely, the single-instance segmentation result. In addition, the skeleton form information is extracted from the single-instance segmentation result, to perform motion analysis and motion component decomposition on the basis of the skeleton form information, so that the current complex skeleton form of each target object can be decomposed into the combination of the plurality of preset motion states. The whole processing procedure can be automatically implemented by a machine without manual intervention. This greatly reduces labor costs and improves analysis efficiency. In addition, deep morphological measurement and kinematics analysis can be performed based on the outputted motion component information, so that accuracy of analyzing the target object is also improved.

Figure 17:
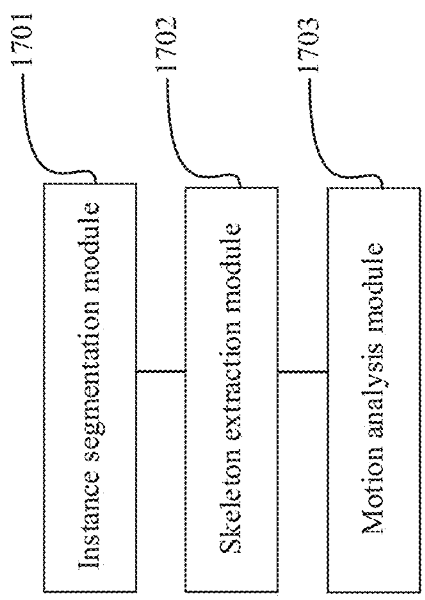
FIG. 17 is a schematic structural diagram of a microscopic image processing apparatus according to an embodiment of this application.

FIG. 17 is a schematic structural diagram of a microscopic image processing apparatus according to an embodiment of this application. As shown in FIG. 17, the apparatus includes:

- an instance segmentation module 1701, configured to perform instance segmentation on a microscopic image to obtain an instance image, the instance image including a target object in the microscopic image;
- a skeleton extraction module 1702, configured to perform skeleton extraction on the target object in the instance image to obtain skeleton form information of the target object, the skeleton form information representing a skeleton form of the target object; and
- a motion analysis module 1703, configured to perform motion analysis on the target object based on the skeleton form information to obtain a plurality of eigenvalues, and determine an eigenvalue sequence including the plurality of eigenvalues as motion component information of the target object, the plurality of eigenvalues representing weighting coefficients that are of a plurality of preset motion states and that are applied during synthesis of the skeleton form.

According to the apparatus provided in this embodiment of this application, the instance segmentation is performed on the target object included in the microscopic image, to determine the instance image of each target object, namely, the single-instance segmentation result. In addition, the skeleton form information is extracted from the single-instance segmentation result, to perform motion analysis and motion component decomposition on the basis of the skeleton form information, so that the current complex skeleton form of each target object can be decomposed into a combination of the plurality of preset motion states. The whole processing procedure can be automatically implemented by a machine without manual intervention. This greatly reduces labor costs and improves analysis efficiency.

In some embodiments, based on the apparatus composition in FIG. 17, the instance image includes a contour image and a mask image of the target object, and the instance segmentation module 1701 includes:

- a determining submodule, configured to determine a ROI including the target object from the microscopic image; and
- a segmentation submodule, configured to perform instance segmentation on the ROI to determine the contour image and the mask image of the target object.

In some embodiments, when the ROI includes a plurality of overlapping target objects, based on the apparatus composition in FIG. 17, the segmentation submodule includes:

- an extraction unit, configured to: determine a ROI candidate frame based on position information of the ROI, a region selected by the ROI candidate frame including the ROI; and determine a local image feature of the ROI from a global image feature of the microscopic image, the local image feature representing a feature of the region selected by the ROI candidate frame in the global image feature; and a processing unit, configured to input the local image feature into a bilayer instance segmentation model, to process the local image feature through the bilayer instance segmentation model, and output respective contour images and mask images of the plurality of target objects in the ROI, the bilayer instance segmentation model being used for respectively establishing layers for different objects to obtain an instance segmentation result of each object.

In some embodiments, the ROI includes an occluder and an occludee that overlap each other.

The bilayer instance segmentation model includes an occluder layer network and an occludee layer network, the occluder layer network being used for extracting a contour and a mask of the occluder at a top layer, and the occludee layer network being used for extracting a contour and a mask of the occludee at a bottom layer.

Based on the apparatus composition in FIG. 17, the processing unit includes:

a first extraction subunit, configured to input the local image feature into the occluder layer network, to extract a first perceptual feature of the occluder at the top layer in the ROI through the occluder layer network, the first perceptual feature representing an image feature of the occluder on an instance segmentation task;

an obtaining subunit, configured to upsample the first perceptual feature to obtain a contour image and a mask image of the occluder;

a second extraction subunit, configured to input, into the occludee layer network, a fused feature obtained by fusing the local image feature and the first perceptual feature, to extract a second perceptual feature of the occludee at the bottom layer in the ROI, the second perceptual feature representing an image feature of the occludee on the instance segmentation task; and an obtaining subunit, configured to upsample the second perceptual feature to obtain a contour image and a mask image of the occludee.

In some embodiments, the occluder layer network includes a first convolution layer, a first graph convolution layer and a second convolution layer, the first graph convolution layer including a non-local operator, and the non-local operator being used for associating pixels in an image space according to similarity of corresponding eigenvectors. The first extraction subunit is configured to:

input the local image feature into the first convolution layer of the occluder layer network, to perform a convolution operation on the local image feature through the first convolution layer to obtain an initial perceptual feature;

input the initial perceptual feature into the first graph convolution layer of the occluder layer network, to perform a convolution operation on the initial perceptual feature through the non-local operator at the first graph convolution layer to obtain a graph convolution feature; and input the graph convolution feature into the second convolution layer of the occluder layer network, to perform a convolution operation on the graph convolution feature through the second convolution layer to obtain a first perceptual feature.

In some embodiments, the second extraction subunit is configured to:

input the fused feature into a third convolution layer of the occludee layer network, to perform a convolution operation on the fused feature through the third convolution layer to obtain a perceptual interaction feature;

input the perceptual interaction feature into a second graph convolution layer of the occludee layer network, to perform a convolution operation on the perceptual interaction feature through a non-local operator at the second graph convolution layer to obtain a graph-convolution interaction feature; and input the graph-convolution interaction feature into a fourth convolution layer of the occludee layer network, to perform a convolution operation on the graph-convolution interaction feature through the fourth convolution layer to obtain the second perceptual feature.

In some embodiments, the bilayer instance segmentation model is obtained through training based on a plurality of synthetic sample images, the synthetic sample image including a plurality of target objects, and being synthesized based on a plurality of original images including only a single target object.

In some embodiments, when the target object is darker than background in the original image, a pixel value of each pixel in the synthetic sample image is equal to a lowest pixel value among pixels in the same position in a plurality of original images used for synthesizing the synthetic sample image. Alternatively, when the target object is brighter than background in the original image, a pixel value of each pixel in the synthetic sample image is equal to a highest pixel value among pixels in the same position in a plurality of original images.

In some embodiments, based on the apparatus composition in FIG. 17, the skeleton extraction module 1702 includes:

a skeleton extraction submodule, configured to input the instance image into a skeleton extraction model for any target object in the ROI, to perform skeleton extraction on the target object through the skeleton extraction model to obtain a skeleton form image, the skeleton extraction model being used for predicting a skeleton form of the target object based on the instance image of the target object;

a recognition submodule, configured to recognize the skeleton form image to obtain a head endpoint and a tail endpoint in the skeleton form of the target object; and an information determining submodule, configured to determine the skeleton form image, the head endpoint, and the tail endpoint as the skeleton form information.

In some embodiments, the skeleton extraction model includes a plurality of cascaded convolution layers. The skeleton extraction submodule is configured to:

input the instance image into the plurality of convolution layers of the skeleton extraction model, to perform convolution operations on the instance image through the plurality of convolution layers to obtain the skeleton form image, the skeleton extraction model being obtained through training based on a sample image including the target object and skeleton form label information labeled on the target object.

In some embodiments, the skeleton form label information includes respective skeleton tangential angles of a plurality of sampling points for sampling a skeleton form of the target object in the sample image, and the skeleton tangential angle represents an angle between a tangent line corresponding to the sampling point as a tangent point and a horizontal line on the directed skeleton form from the head endpoint to the tail endpoint.

A loss function value of the skeleton extraction model at a training stage is determined based on errors between the respective skeleton tangential angles and predicted tangential angles of the sampling points, the predicted tangential angle being obtained by sampling a skeleton form image obtained by predicting the sample image by the skeleton extraction model.

In some embodiments, based on the apparatus composition in FIG. 17, the recognition submodule includes:

a truncation unit, configured to truncate the skeleton form image to obtain a first local endpoint region and a second local endpoint region, the first local endpoint region and the second local endpoint region being located at two ends of a skeleton;

a feature extraction unit, configured to extract a first histogram of oriented gradient HOG feature at one end of the skeleton based on the first local endpoint region, the feature extraction unit being further configured to extract a second HOG feature of the other end of the skeleton based on the second local endpoint region; and a recognition unit, configured to recognize the one end and the other end of the skeleton respectively based on the first HOG feature and the second HOG feature to obtain the head endpoint and the tail endpoint.

In some embodiments, the recognition unit is configured to:

input the first HOG feature into a head-tail recognition model, to perform binary classification on the first HOG feature through the head-tail recognition model to obtain a first recognition result, the first recognition result representing whether the one end of the skeleton is the head endpoint or the tail endpoint;

input the second HOG feature into the head-tail recognition model, to perform binary classification on the second HOG feature through the head-tail recognition model to obtain a second recognition result, the second recognition result representing whether the other end of the skeleton is the head endpoint or the tail endpoint; and determine the head endpoint and the tail endpoint based on the first recognition result and the second recognition result.

The head-tail recognition model being used for determining whether an endpoint in a skeleton of a target object is a head endpoint or a tail endpoint according to a HOG feature of a local endpoint region.

In an embodiment, based on the apparatus composition in FIG. 17, the motion analysis module 1703 includes:

a sampling submodule, configured to sample the skeleton form of the target object based on the skeleton form information to obtain an eigenvector formed by respective skeleton tangential angles of a plurality of sampling points, the skeleton tangential angle representing an angle between a tangent line corresponding to the sampling point as a tangent point and the horizontal line on the directed skeleton form from the head endpoint to the tail endpoint; and a decomposition submodule, configured to: respectively sample preset skeleton forms indicated by the plurality of preset motion states to obtain respective preset eigenvectors of the plurality of preset motion states; and decompose the eigenvector into a sum of products of the plurality of preset eigenvectors and the plurality of eigenvalues, and determine an eigenvalue sequence including the plurality of eigenvalues as motion component information.

In some embodiments, the motion analysis module 1703 is further configured to:

sort the plurality of eigenvalues in the eigenvalue sequence in descending order, and determine a preset motion state corresponding to an eigenvalue in a top target position in an order as a motion principal component; and analyze motion of the target object in an observation period based on the motion principal component, to obtain a kinematic feature of the target object in the observation period.

Figure 18:
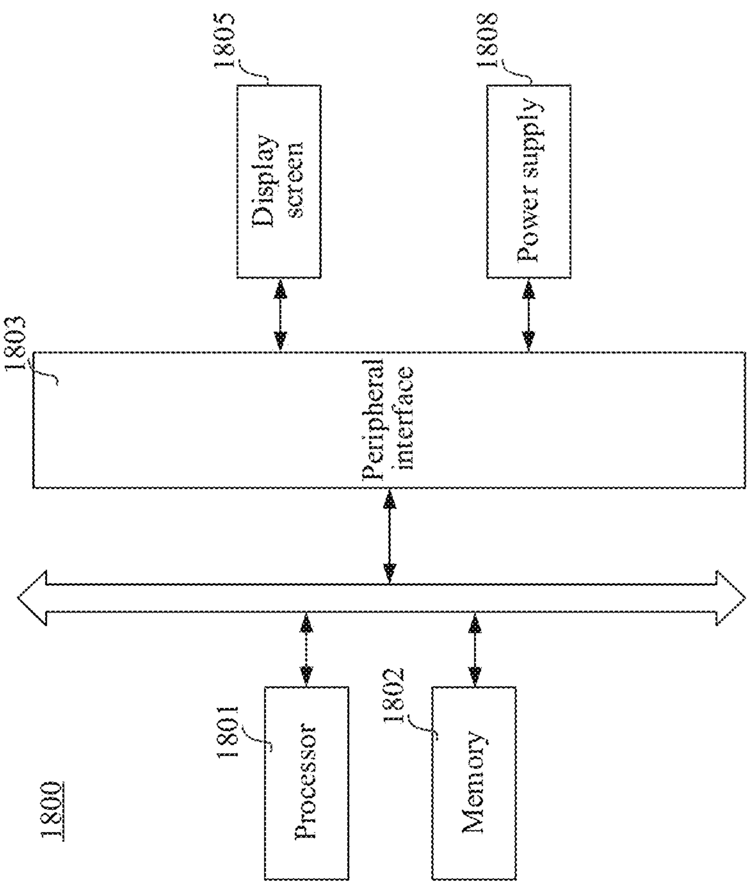
FIG. 18 is a schematic structural diagram of a terminal according to an embodiment of this application.

FIG. 18 is a schematic structural diagram of a terminal according to an embodiment of this application. The terminal 1800 is an exemplary description of a computer device. Usually, the terminal 1800 includes: a processor 1801 and a memory 1802.

In some embodiments, the processor 1801 includes one or more processing cores, for example, is a 4-core processor or an 8-core processor. In some embodiments, the processor 1801 may be implemented in at least one hardware form among a digital signal processor (DSP), a field-programmable gate array (FPGA), and a programmable logic array (PLA). In some embodiments, the processor 1801 includes a main processor and a coprocessor. The main processor is a processor configured to process data in an awake state, and is also referred to as a central processing unit (CPU). The coprocessor is a low-power-consumption processor configured to process data in a standby state. In some embodiments, the processor 1801 is integrated with a graphics processing unit (GPU). The GPU is configured to render and draw content that needs to be displayed on a display screen. In some embodiments, the processor 1801 further includes an artificial intelligence (AI) processor. The AI processor is configured to process computing operations related to machine learning.

In some embodiments, the memory 1802 includes one or more computer-readable storage media. In some embodiments, the computer-readable storage medium is non-transitory. In some embodiments, the memory 1802 further includes a high-speed random access memory (RAM) and a nonvolatile memory, for example, one or more disk storage devices or flash storage devices. In some embodiments, the non-transitory computer-readable storage medium in the memory 1802 is configured to store at least one program code, and the at least one program code is executed by the processor 1801 to implement the microscopic image processing method provided in the embodiments of this application.

In some embodiments, In some embodiments, the terminal 1800 further includes: a peripheral interface 1803 and at least one peripheral. The processor 1801, the memory 1802, and the peripheral interface 1803 can be connected through a bus or a signal cable. Each peripheral can be connected to the peripheral interface 1803 through a bus, a signal cable, or a circuit board. Specifically, the peripheral includes: at least one of a display screen 1805 and a power supply 1808.

The peripheral interface 1803 may be configured to connect the at least one peripheral related to input/output (I/O) to the processor 1801 and the memory 1802. In some embodiments, the processor 1801, the memory 1802, and the peripheral interface 1803 are integrated on the same chip or circuit board. In some other embodiments, any one or two of the processor 1801, the memory 1802, and the peripheral interface 1803 are implemented on a single chip or circuit board. This is not limited in this embodiment.

The display screen 1805 is configured to display a user interface (UI). In some embodiments, the UI includes a graph, text, an icon, a video, and any combination thereof. When the display screen 1805 is a touch display screen, the display screen 1805 further has a capability of acquiring a touch signal on or above a surface of the display screen 1805. The touch signal can be inputted into the processor 1801 as a control signal for processing. In some embodiments, the display screen 1805 is further configured to provide a virtual button and/or a virtual keyboard that are/is also referred to as a soft button and/or a soft keyboard. In some embodiments, there is one display screen 1805 that is arranged on a front panel of the terminal 1800. In some other embodiments, there are at least two display screens 1805 that are respectively arranged on different surfaces of the terminal 1800 or in a folded design. In some embodiments, the display screen 1805 is a flexible display screen arranged on a curved surface or a folded surface of the terminal 1800. In some embodiments, the display screen 1805 is even set in a non-rectangular irregular pattern, in other words, is set as a special-shaped screen. In some embodiments, the display screen 1805 is prepared by using materials such as a liquid crystal display (LCD) or an organic light-emitting diode (OLED).

The power supply 1808 is configured to supply power to components in the terminal 1800. In some embodiments, the power supply 1808 is an alternating current, a direct current, a primary battery, or a rechargeable battery. When the power supply 1808 includes the rechargeable battery, the rechargeable battery supports wired charging or wireless charging. The rechargeable battery is further configured to support a fast charging technology.

Figure 19:
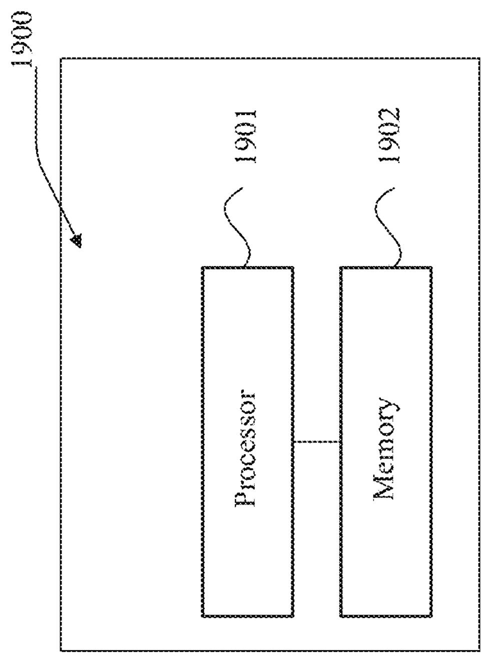
FIG. 19 is a schematic structural diagram of a computer device according to an embodiment of this application.

FIG. 19 is a schematic structural diagram of a computer device according to an embodiment of this application. The computer device 1900 may vary a lot with a configuration or performance, and includes one or more CPUs 1901 and one or more memories 1902. The memory 1902 stores at least one computer program, and the at least one computer program is loaded and executed by the one or more processors 1901 to implement the microscopic image processing method provided in the foregoing embodiments. In some embodiments, the computer device 1900 further includes components such as a wired or wireless network interface, a keyboard, and an input/output interface, to facilitate inputting and outputting. The computer device 1900 further includes another component configured to implement a device function. Details are not described herein.

In an exemplary embodiment, a computer-readable storage medium, for example, a memory including at least one computer program, is further provided. The at least one computer program may be executed by a processor in a terminal to complete the microscopic image processing method in the foregoing embodiments. For example, the computer-readable storage medium includes a read-only memory (ROM), a RAM, a compact disc ROM (CD-ROM), a magnetic tape, a floppy disk, and an optical data storage device.

In an exemplary embodiment, a computer program product or a computer program is further provided. The computer program product or the computer program includes one or more program codes, and the one or more program codes are stored in a computer-readable storage medium. One or more processors of a computer device can read the one or more program codes from the computer-readable storage medium and execute the one or more program codes, so that the computer device can perform the microscopic image processing method in the foregoing embodiments.

In this application, the term "module" or "unit" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each module or unit can be implemented using one or more processors (or processors and memory). Likewise, a processor (or processors and memory) can be used to implement one or more modules or units. Moreover, each module or unit can be part of an overall module that includes the functionalities of the module.

What is claimed is:

1. A microscopic image processing method performed by a computer device, the method comprising:
- extracting an instance image of a target object from a microscopic image;
- obtaining skeleton form information of the target object from the instance image, the skeleton form information representing a skeleton form of the target object, further including:
  - inputting the instance image into a plurality of cascaded convolution layers of skeleton extraction model for any target object in a ROI;
  - performing convolution operations on the instance image layer by layer through the plurality of cascaded convolution layers to obtain a skeleton form image of the target object;
  - recognizing, separately, a head endpoint and a tail endpoint in the skeleton form image of the target object; and
  - determining the skeleton form image, the head endpoint, and the tail endpoint as the skeleton form information;
- performing motion analysis on the target object based on the skeleton form information to obtain a plurality of eigenvalues; and
- determining an eigenvalue sequence comprising the plurality of eigenvalues as motion component information of the target object.

2. The method according to claim 1, wherein the plurality of eigenvalues represent weighting coefficients for synthesizing the skeleton form of the target object in a plurality of preset motion states.

3. The method according to claim 1, wherein the instance image comprises a contour image and a mask image of the target object; and
- the extracting an instance image of a target object from a microscopic image comprises:
- determining a region of interest ROI comprising the target object from the microscopic image; and
- performing instance segmentation on the ROI to obtain the contour image and the mask image of the target object.

4. The method according to claim 3, wherein when there are a plurality of target objects in the microscopic image, and the ROI comprises the plurality of target objects that overlap each other, the performing instance segmentation on the ROI to obtain the contour image and the mask image of the target object comprises:
- determining a ROI candidate frame based on position information of the ROI, a region selected by the ROI candidate frame comprising the ROI;

determining a local image feature of the ROI from a global image feature of the microscopic image, the local image feature representing a feature of the region selected by the ROI candidate frame in the global image feature; and inputting the local image feature into a bilayer instance segmentation model, to process the local image feature through the bilayer instance segmentation model, and output respective contour images and mask images of the plurality of target objects in the ROI, the bilayer instance segmentation model being used for respectively establishing layers for different objects to obtain an instance segmentation result of each object.

5. The method according to claim 1, wherein the performing motion analysis on the target object based on the skeleton form information to obtain a plurality of eigenvalues comprises:

sampling the skeleton form of the target object based on the skeleton form information to obtain an eigenvector formed by respective skeleton tangential angles of a plurality of sampling points, the skeleton tangential angle representing an angle between a tangent line corresponding to the sampling point as a tangent point and the horizontal line on the directed skeleton form from a head endpoint to a tail endpoint;

separately sampling preset skeleton forms indicated by the plurality of preset motion states, to obtain respective preset eigenvectors of the plurality of preset motion states; and decomposing the eigenvector into a sum of products of the plurality of preset eigenvectors and the plurality of eigenvalues to obtain the plurality of eigenvalues.

6. The method according to claim 5, wherein the method further comprises:

sorting the plurality of eigenvalues in the eigenvalue sequence in a descending order, and determining a preset motion state corresponding to an eigenvalue in a top target position in the descending order as a motion principal component; and analyzing motion of the target object in an observation period based on the motion principal component, to obtain a kinematic feature of the target object in the observation period.

7. A computer device, comprising one or more processors and one or more memories, the one or more memories storing at least one computer program, and the at least one computer program being loaded and executed by the one or more processors and causing the computer device to implement a microscopic image processing method including:

extracting an instance image of a target object from a microscopic image;

obtaining skeleton form information of the target object from the instance image, the skeleton form information representing a skeleton form of the target object, further including:

inputting the instance image into a plurality of cascaded convolution layers of skeleton extraction model for any target object in a ROI;

performing convolution operations on the instance image layer by layer through the plurality of cascaded convolution layers to obtain a skeleton form image of the target object;

recognizing, separately, a head endpoint and a tail endpoint in the skeleton form image of the target object; and determining the skeleton form image, the head endpoint, and the tail endpoint as the skeleton form information;

performing motion analysis on the target object based on the skeleton form information to obtain a plurality of eigenvalues; and determining an eigenvalue sequence comprising the plurality of eigenvalues as motion component information of the target object.

8. The computer device according to claim 7, wherein the plurality of eigenvalues represent weighting coefficients for synthesizing the skeleton form of the target object in a plurality of preset motion states.

9. The computer device according to claim 7, wherein the instance image comprises a contour image and a mask image of the target object; and the extracting an instance image of a target object from a microscopic image comprises:

determining a region of interest ROI comprising the target object from the microscopic image; and performing instance segmentation on the ROI to obtain the contour image and the mask image of the target object.

10. The computer device according to claim 9, wherein when there are a plurality of target objects in the microscopic image, and the ROI comprises the plurality of target objects that overlap each other, the performing instance segmentation on the ROI to obtain the contour image and the mask image of the target object comprises:

determining a ROI candidate frame based on position information of the ROI, a region selected by the ROI candidate frame comprising the ROI;

determining a local image feature of the ROI from a global image feature of the microscopic image, the local image feature representing a feature of the region selected by the ROI candidate frame in the global image feature; and inputting the local image feature into a bilayer instance segmentation model, to process the local image feature through the bilayer instance segmentation model, and output respective contour images and mask images of the plurality of target objects in the ROI, the bilayer instance segmentation model being used for respectively establishing layers for different objects to obtain an instance segmentation result of each object.

11. The computer device according to claim 7, wherein the performing motion analysis on the target object based on the skeleton form information to obtain a plurality of eigenvalues comprises:

sampling the skeleton form of the target object based on the skeleton form information to obtain an eigenvector formed by respective skeleton tangential angles of a plurality of sampling points, the skeleton tangential angle representing an angle between a tangent line corresponding to the sampling point as a tangent point and the horizontal line on the directed skeleton form from a head endpoint to a tail endpoint;

separately sampling preset skeleton forms indicated by the plurality of preset motion states, to obtain respective preset eigenvectors of the plurality of preset motion states; and decomposing the eigenvector into a sum of products of the plurality of preset eigenvectors and the plurality of eigenvalues to obtain the plurality of eigenvalues.

12. The computer device according to claim 11, wherein the method further comprises:

sorting the plurality of eigenvalues in the eigenvalue sequence in a descending order, and determining a preset motion state corresponding to an eigenvalue in a top target position in the descending order as a motion principal component; and analyzing motion of the target object in an observation period based on the motion principal component, to obtain a kinematic feature of the target object in the observation period.

13. A non-transitory computer-readable storage medium, storing at least one computer program, the at least one computer program being loaded and executed by a processor of a computer device and causing the computer device to implement a microscopic image processing method including:

extracting an instance image of a target object from a microscopic image;

obtaining skeleton form information of the target object from the instance image, the skeleton form information representing a skeleton form of the target object, further including:

inputting the instance image into a plurality of cascaded convolution layers of skeleton extraction model for any target object in a ROI;

performing convolution operations on the instance image layer by layer through the plurality of cascaded convolution layers to obtain a skeleton form image of the target object;

recognizing, separately, a head endpoint and a tail endpoint in the skeleton form image of the target object; and determining the skeleton form image, the head endpoint, and the tail endpoint as the skeleton form information;

performing motion analysis on the target object based on the skeleton form information to obtain a plurality of eigenvalues; and determining an eigenvalue sequence comprising the plurality of eigenvalues as motion component information of the target object.

14. The non-transitory computer-readable storage medium according to claim 13, wherein the plurality of eigenvalues represent weighting coefficients for synthesizing the skeleton form of the target object in a plurality of preset motion states.

15. The non-transitory computer-readable storage medium according to claim 13, wherein the instance image comprises a contour image and a mask image of the target object; and the extracting an instance image of a target object from a microscopic image comprises:

determining a region of interest ROI comprising the target object from the microscopic image; and performing instance segmentation on the ROI to obtain the contour image and the mask image of the target object.

16. The non-transitory computer-readable storage medium according to claim 15, wherein when there are a plurality of target objects in the microscopic image, and the ROI comprises the plurality of target objects that overlap each other, the performing instance segmentation on the ROI to obtain the contour image and the mask image of the target object comprises:

determining a ROI candidate frame based on position information of the ROI, a region selected by the ROI candidate frame comprising the ROI;

determining a local image feature of the ROI from a global image feature of the microscopic image, the local image feature representing a feature of the region selected by the ROI candidate frame in the global image feature; and inputting the local image feature into a bilayer instance segmentation model, to process the local image feature through the bilayer instance segmentation model, and output respective contour images and mask images of the plurality of target objects in the ROI, the bilayer instance segmentation model being used for respectively establishing layers for different objects to obtain an instance segmentation result of each object.

17. The non-transitory computer-readable storage medium according to claim 13, wherein the performing motion analysis on the target object based on the skeleton form information to obtain a plurality of eigenvalues comprises:

sampling the skeleton form of the target object based on the skeleton form information to obtain an eigenvector formed by respective skeleton tangential angles of a plurality of sampling points, the skeleton tangential angle representing an angle between a tangent line corresponding to the sampling point as a tangent point and the horizontal line on the directed skeleton form from a head endpoint to a tail endpoint;

separately sampling preset skeleton forms indicated by the plurality of preset motion states, to obtain respective preset eigenvectors of the plurality of preset motion states; and decomposing the eigenvector into a sum of products of the plurality of preset eigenvectors and the plurality of eigenvalues to obtain the plurality of eigenvalues.

18. The non-transitory computer-readable storage medium according to claim 17, wherein the method further comprises:

sorting the plurality of eigenvalues in the eigenvalue sequence in a descending order, and determining a preset motion state corresponding to an eigenvalue in a top target position in the descending order as a motion principal component; and analyzing motion of the target object in an observation period based on the motion principal component, to obtain a kinematic feature of the target object in the observation period.

* * * * *